(12) United States Patent
Miyazaki

(10) Patent No.: US 8,866,461 B2
(45) Date of Patent: Oct. 21, 2014

(54) POWER CIRCUIT

(75) Inventor: Takayuki Miyazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 13/616,553

(22) Filed: Sep. 14, 2012

(65) Prior Publication Data

US 2013/0154606 A1 Jun. 20, 2013

(30) Foreign Application Priority Data

Dec. 19, 2011 (JP) ................................ 2011-276725

(51) Int. Cl.
*G05F 1/00* (2006.01)

(52) U.S. Cl.
USPC ........................................................ 323/283

(58) Field of Classification Search
USPC .......... 323/234, 237, 242, 265, 282–285, 322
See application file for complete search history.

(56) References Cited

U.S. PATENT DOCUMENTS

| 6,160,388 | A * | 12/2000 | Skelton et al. | 323/282 |
| 2007/0040537 | A1* | 2/2007 | Low et al. | 323/282 |
| 2007/0085521 | A1* | 4/2007 | Nagai | 323/283 |
| 2008/0001587 | A1* | 1/2008 | Cremoux | 323/282 |

FOREIGN PATENT DOCUMENTS

| JP | 2005-176532 | 6/2005 |
| JP | 2010-62891 | 3/2010 |
| JP | 2010-178553 | 8/2010 |

\* cited by examiner

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

According to one embodiment, there is provided a power circuit including a DC/DC converter, an A/D converter, a control unit, a determining unit, and a conversion timing adjusting unit. The determining unit determines whether a transition timing of the conversion candidate timing signal overlaps a transition timing of the first switching signal or a transition timing of the second switching signal. The conversion timing adjusting unit adjusts the conversion candidate timing signal so that the transition timing of the conversion candidate timing signal does not overlap the transition timing of the first switching signal and the transition timing of the second switching signal when the transition timing of the conversion candidate timing signal overlaps the transition timing of the first switching signal or the transition timing of the second switching signal to thereby generate the conversion timing signal.

19 Claims, 23 Drawing Sheets

POWER CIRCUIT

CROSS-REFERENCE TO RELATED APPLICATIONS

This application is based upon and claims the benefit of priority from Japanese Patent Application No. 2011-276725, filed on Dec. 19, 2011; the entire contents of which are incorporated herein by reference.

FIELD

Embodiments described herein relate generally to a power circuit.

BACKGROUND

In digital power circuits, since control is performed based on digital values, it is necessary to perform A/D conversion using an A/D converter to convert an analog value such as an output voltage or the like of a DC/DC converter necessary for control to a digital value and to input the digital value to a control circuit. However, in switching power circuits, since a large amount of noise occurs with switching of a DC/DC converter and affects the operation of an A/D converter, it is difficult to obtain an accurate digital value.

DETAILED DESCRIPTION

In general, according to one embodiment, there is provided a power circuit including a DC/DC converter, an A/D converter, a control unit, a determining unit, and a conversion timing adjusting unit. The DC/DC converter includes a first switch that is turned on according to a first switching signal and a second switch that is turned on according to a second switching signal. In the DC/DC converter an on state period of the first switch does not overlap an on state period of the second switch. The A/D converter performs A/D conversion on an analog monitoring value of the DC/DC converter in synchronization with a conversion timing signal to generate a digital monitoring value. The control unit performs PWM control on each of the first switching signal and the second switching signal using the generated digital monitoring value. The determining unit receives a signal associated with the PWM control and a signal associated with a conversion candidate timing signal that serves as a candidate for the conversion timing signal and determines whether a transition timing of the conversion candidate timing signal overlaps a transition timing of the first switching signal or a transition timing of the second switching signal. The conversion timing adjusting unit adjusts the conversion candidate timing signal so that the transition timing of the conversion candidate timing signal does not overlap the transition timing of the first switching signal and the transition timing of the second switching signal when the transition timing of the conversion candidate timing signal overlaps the transition timing of the first switching signal or the transition timing of the second switching signal to thereby generate the conversion timing signal.

Exemplary embodiments of a power circuit will be explained below in detail with reference to the accompanying drawings. The present invention is not limited to the following embodiments.

First Embodiment

Figure 1:
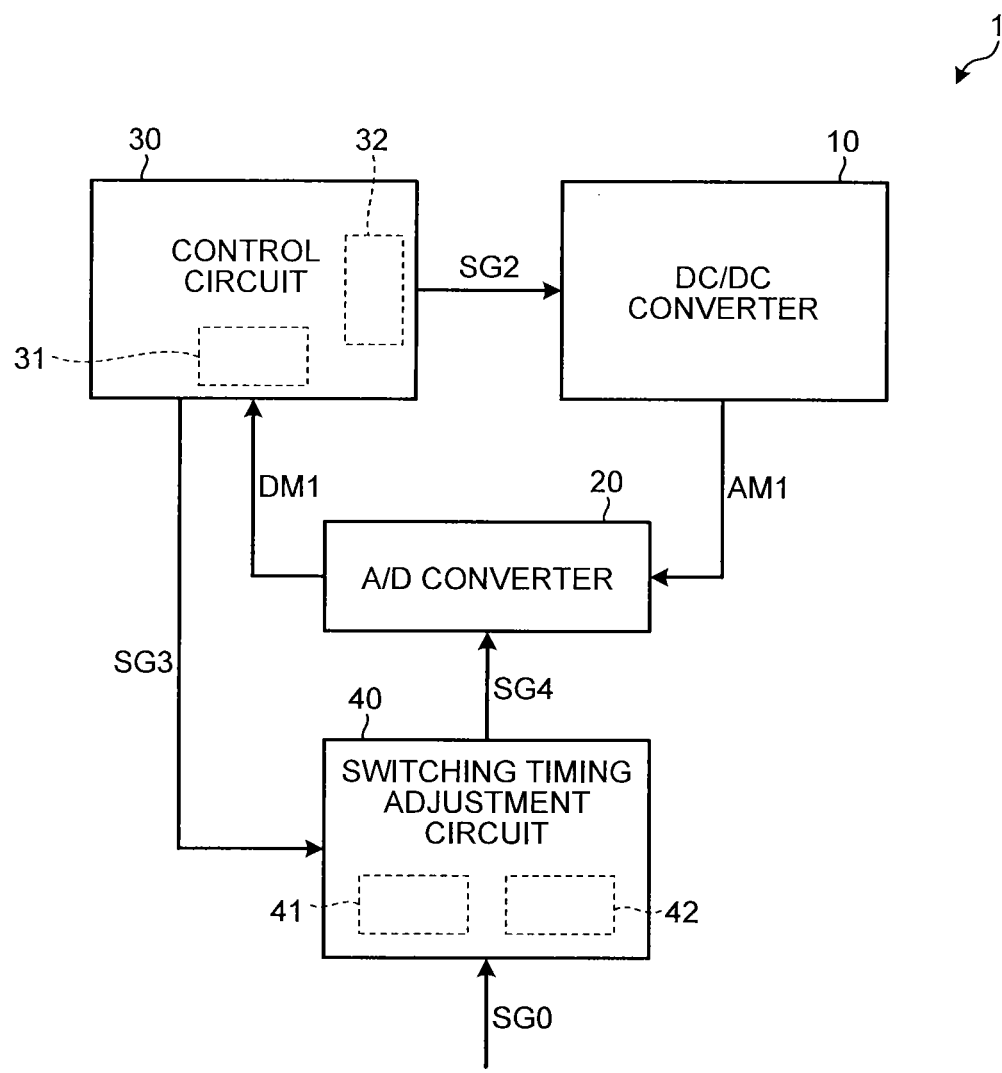
FIG. 1 is a diagram illustrating a configuration of a power circuit according to a first embodiment.

A power circuit 1 according to a first embodiment will be explained with reference to FIG. 1. FIG. 1 is a diagram illustrating a configuration of the power circuit 1.

The power circuit 1 is a digital power circuit and performs control primarily using a digital value. The power circuit 1 A/D-converts an analog value such as an output voltage necessary for control to a digital value and performs control using the digital value. Specifically, the power circuit 1 includes a DC/DC converter 10, an A/D converter 20, a control circuit 30, and a switch timing adjustment circuit 40.

The DC/DC converter 10 converts a DC voltage received from the outside to a DC voltage of a predetermined level and outputs the DC voltage. The DC/DC converter 10 is a step-down DC/DC converter (buck converter), for example, and steps down an input DC voltage to output a DC voltage stepped down to a predetermined level.

Figure 2:
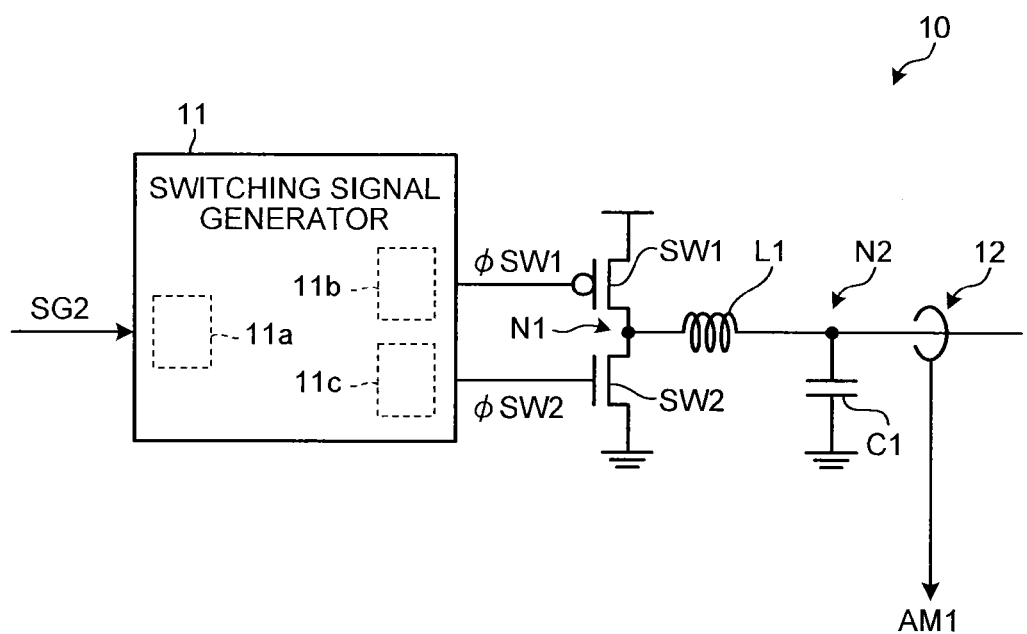
FIG. 2 is a diagram illustrating a configuration of a DC/DC converter according to the first embodiment.

Specifically, as illustrated in FIG. 2, the DC/DC converter 10 includes a switching signal generator 11, a plurality of switches SW1 and SW2, an inductor L1, a capacitor C1, and a current sensor 12.

The switching signal generator 11 receives a control signal SG2 from the control circuit 30 and controls the turning on/off of the plurality of switches SW1 and SW2 according to the control signal SG2. In this way, the on/off timing of the switches SW1 and SW2 is controlled by the control circuit 30.

The switching signal generator 11 includes a decoding unit 11a, a switching signal generating unit 11b, and a switching signal generating unit 11c. The decoding unit 11a decodes the control signal SG2 to extract a control value for the switch SW1 from the decoding result and supply the control value to the switching signal generating unit 11b and extracts a control value for the switch SW2 from the decoding result to supply the control value to the switching signal generating unit 11c. The switching signal generating unit 11b generates a first switching signal φSW1 according to the control value for the switch SW1 and supplies the first switching signal φSW1 to a control terminal of the switch SW1. The switching signal generating unit 11c generates a second switching signal φSW2 according to the control value for the switch SW2 and supplies the second switching signal φSW2 to a control terminal of the switch SW2.

The plurality of switches SW1 and SW2 are maintained in the on state in a non-overlapping period. For example, as illustrated in FIG. 2, the plurality of switches SW1 and SW2 are inverter-connected PMOS and NMOS transistors, and the plurality of switches SW1 and SW2 are maintained in the on state in a non-overlapping period in order to prevent a penetration current from flowing between a source potential node and a ground potential node.

The switch SW1 is maintained in the on state in a period where the first switching signal φSW1 is in an active level (for example, the L level) and is maintained in the off state in a period where the first switching signal φSW1 is in a non-active level (for example, the H level). The switch SW2 is maintained in the on state in a period where the second switching signal φSW2 is in the active level (for example, the H level) and is maintained in the off state in a period where the second switching signal φSW2 is in a non-active level (for example, the L level). That is, the period where the first switching signal φSW1 is in the active level (for example, the L level) and the period where the second switching signal φSW2 is in the active level (for example, the H level) are adjusted by the switching signal generator 11 or the control circuit 30 so as not to overlap (see FIG. 3).

For example, the switch SW1 (the PMOS transistor) has a source connected to the source potential node and a drain connected to a node N1 (a switching node). For example, the switch SW2 (the NMOS transistor) has a source connected to the ground potential node and a drain connected to the node N1 (the switching node).

A current flows into the inductor L1 from the source potential node through the switch SW1 and the node N1 (the switching node) in a period where the switch SW1 is in the on state and the switch SW2 is in the off state, and energy corresponding to the current is stored in the inductor L1. The inductor L1 generates electromotive force in order to maintain the current in a period where the switch SW1 is in the off state and the switch SW2 is in the on state, causes an inductive current to flow from the node N1 (the switching node) to a node N2 (an output node), and discharges the stored energy.

The capacitor C1 smoothes out a change in the voltage output from the inductor L1 to the node N2 to generate a stepped-down DC voltage and outputs the DC voltage through the node N2 (the output node).

The current sensor 12 detects a current output from the inductor L1 to the node N2 (the output node), namely the output current of the DC/DC converter 10 and outputs the output current to the A/D converter 20 as an analog monitoring value AM1.

In FIG. 2, a configuration of a case in which the analog monitoring value AM1 output from the DC/DC converter 10 to the A/D converter 20 includes the output current is illustrated by way of an example. However, the analog monitoring value AM1 may include at least one of the output voltage of the DC/DC converter 10, the output current of the DC/DC converter 10, the current of the inductor L1, the voltage of the current node N1 of the capacitor C1, and the current of the node N1, or a combination of two or more of the above values.

The A/D converter 20 illustrated in FIG. 1 receives the analog monitoring value AM1 from the DC/DC converter 10 and receives a conversion timing signal SG4 from the switch timing adjustment circuit 40. The A/D converter 20 performs A/D conversion on the analog monitoring value AM1 of the DC/DC converter 10 in synchronization with the conversion timing signal SG4 to generate a digital monitoring value DM1. The A/D converter 20 supplies the generated digital monitoring value DM1 to the control circuit 30.

The control circuit 30 receives the digital monitoring value DM1 from the A/D converter 20 and performs PWM control on each of the first switching signal SW1 and the second switching signal SW2 using the digital monitoring value DM1.

Specifically, the control circuit 30 includes a deciding unit 31 and a digital PWM control unit 32.

The deciding unit 31 acquires the digital monitoring value DM1 and decides a control content including the on/off timing of the first switching signal φSW1 and the on/off timing of the second switching signal φSW2 so that the digital monitoring value DM1 approaches a target value, that is, a DC voltage stepped down to a predetermined level is output from the DC/DC converter 10. The deciding unit 31 generates a control signal SG3 corresponding to the decided control content and supplies the control signal SG3 to the digital PWM control unit 32 and the switch timing adjustment circuit 40.

The digital PWM control unit 32 receives the control signal SG3 from the deciding unit 31 and performs PWM control on the switching signal generator 11 according to the control signal SG3. That is, the digital PWM control unit 32 generates a control signal SG2 for performing PWM control on each of the first switching signal SW1 and the second switching signal SW2 according to a control content represented by the control signal SG3. The digital PWM control unit 32 supplies the generated control signal SG2 to the DC/DC converter 10.

The switch timing adjustment circuit 40 receives the control signal SG3 from the control circuit 30 and performs adjustment of the operation timing of the A/D converter 20 using the control signal SG3. Specifically, the switch timing adjustment circuit 40 includes a determining unit 41 and a conversion timing adjusting unit 42.

The determining unit 41 receives the control signal SG3 from the control circuit 30 as a signal associated with the PWM control. The determining unit 41 estimates a transition timing of the first switching signal φSW1 and a transition timing of the second switching signal φSW2 based on the control signal SG3. Moreover, the determining unit 41 receives a control signal SG0 associated with a conversion candidate timing signal SG1 that serves as a candidate for the conversion timing signal SG4 from the outside (for example, a high-level controller that is not illustrated). The determining unit 41 estimates a transition timing of the conversion candidate timing signal SG1 based on the control signal SG0. Moreover, the determining unit 41 determines whether the transition timing of the conversion candidate timing signal SG1 overlaps the transition timing of the first switching signal φSW1 or the transition timing of the second switching signal φSW2 using the estimated content and supplies a determination result to the conversion timing adjusting unit 42.

When the determination result shows that the transition timing of the conversion candidate timing signal SG1 overlaps the transition timing of the first switching signal φSW1 or the transition timing of the second switching signal φSW2, the conversion timing adjusting unit 42 generates the conversion timing signal SG4 by adjusting the conversion candidate timing signal SG1 so that the transition timing of the conversion candidate timing signal SG1 does not overlap the transition timing of the first switching signal φSW1 and the transition timing of the second switching signal φSW2.

For example, the conversion timing adjusting unit 42 calculates a timing (for example, a timing t11 illustrated in FIG. 3 and a timing t12 illustrated in FIG. 4) that does not overlap the transition timing of the first switching signal φSW1 and the transition timing of the second switching signal φSW2. The conversion timing adjusting unit 42 generates the conversion timing signal SG4 by shifting the transition timing of the conversion candidate timing signal SG1 to the calculated timing.

Next, details of the operation content of the switch timing adjustment circuit 40 will be described.

When the operation timing of the A/D conversion overlaps the on/off timing of the switches SW1 and SW2 of the DC/DC converter 10, the switch timing adjustment circuit 40 adjusts the operation timing of the A/D conversion so as not to overlap the on/off timing of the switches SW1 and SW2. When the transition timing of the conversion candidate timing signal SG1 overlaps the transition timing of the first switching signal φSW1 or the transition timing of the second switching signal SW2, the switch timing adjustment circuit 40 adjusts the conversion candidate timing signal SG1 so that the transition timing of the conversion candidate timing signal SG1 does not overlap the transition timing of the first switching signal φSW1 and the transition timing of the second switching signal φSW2. For example, the switch timing adjustment circuit 40 calculates a timing that does not overlap the transition timing of the first switching signal φSW1 and the transition timing of the second switching signal φSW1 and shifts the transition timing of the conversion candidate timing signal SG4 to the calculated timing.

That is, the A/D converter 20 performs A/D conversion in synchronization with the conversion timing signal SG4. In this case, since a large amount of switching noise occurs at the on-timing or the off-timing of the switches SW1 and SW2, the conversion timing signal SG4 is generated by adjusting the conversion candidate timing signal SG1 so as not to overlap this timing. By performing A/D conversion in synchronization with the conversion timing signal SG4 generated in this manner, it is possible to perform A/D conversion while suppressing the influence of the switching noise. The A/D converter 20 may be an A/D converter of a type that does not sample the input and may be an A/D converter of a type that performs conversion after sampling the input.

For example, an operation of a case when the DC/DC converter 10 includes inverter connected switches SW1 and SW2 (for example, PMOS and NMOS transistors, respectively) as illustrated in FIG. 2, and the A/D converter 20 performs A/D conversion on the input analog monitoring value AM1 at the rising edge of the conversion timing signal SG4 will be described by way of an example.

In FIG. 2, since the switch SW1 is a PMOS transistor, for example, the switch SW1 is turned on when the first switching signal φSW1 supplied to the control terminal (the gate) thereof is in the L level and is turned off when the first switching signal φSW1 is in the H level. That is, the first switching signal φSW1 is a low active signal. Since the switch SW2 is a NMOS transistor, for example, the switch SW2 is turned on when the second switching signal φSW2 supplied to the control terminal (the gate) thereof is in the H level and is turned off when the second switching signal φSW2 is in the L level. That is, the second switching signal φSW2 is a high active signal.

Figure 3:
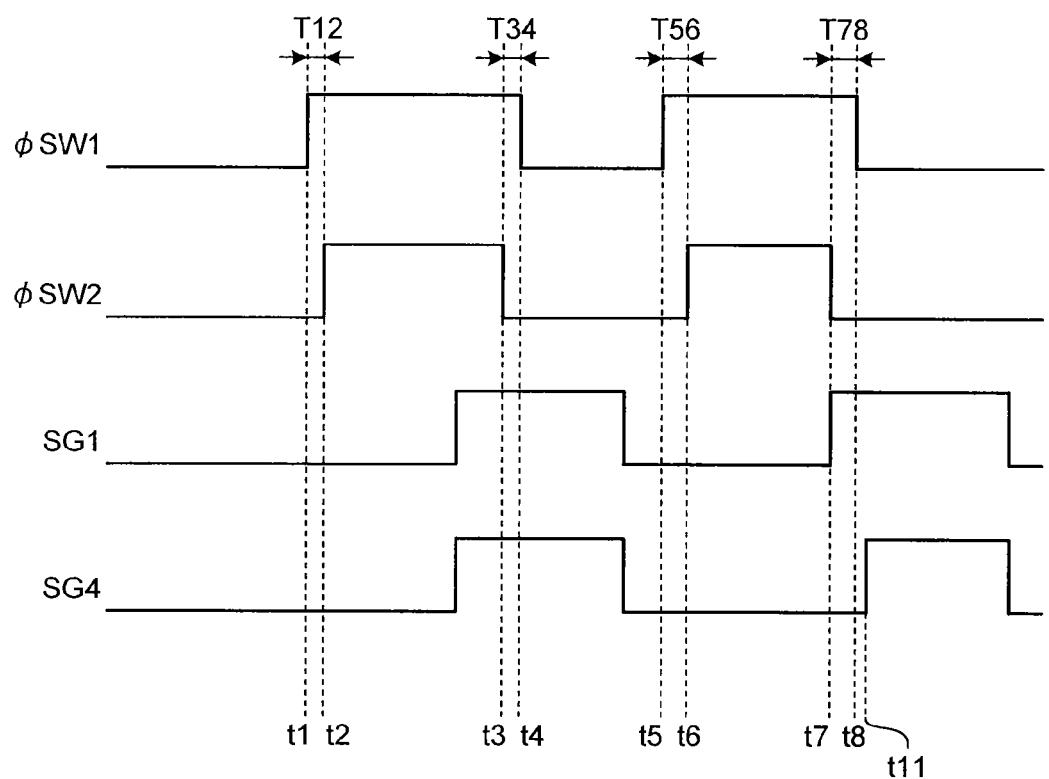
FIG. 3 is a diagram illustrating an operation of a switch timing adjustment circuit according to the first embodiment.

For example, in the timing waveform diagram illustrated in FIG. 3, a timing t1 is a timing at which the switch SW1 is turned off, a timing t2 is a timing at which the switch SW2 is turned on, and both the switches SW1 and SW2 are turned off in a period between the timings t1 and t2. Moreover, a timing t3 is a timing at which the switch SW2 is turned off, a timing t4 is a timing at which the switch SW1 is turned on, and both the switches SW1 and SW2 are turned off in a period between the timings t3 and t4.

Similarly, a timing t5 is a timing at which the switch SW1 is turned off, a timing t6 is a timing at which the switch SW2 is turned on, and both the switches SW1 and SW2 are turned off in a period between the timings t5 and t6. Moreover, a timing t7 is a timing at which the switch SW2 is turned off, a timing t8 is a timing at which the switch SW1 is turned on, and both the switches SW1 and SW2 are turned off in a period between the timings t7 and t8.

A large amount of switching noise occurs with switching of the DC/DC converter 10 at the timings t1 and t2 and in the period T12 between both timings. A large amount of switching noise occurs with switching of the DC/DC converter 10 at the timings t3 and t4 and in the period T34 between both timings. A large amount of switching noise occurs with switching of the DC/DC converter 10 at the timings t5 and t6 and in the period T56 between both timings. A large amount of switching noise occurs with switching of the DC/DC converter 10 at the timings t7 and t8 and in the period T78 between both timings.

For example, as illustrated in FIG. 3, a case where the rising timing of the conversion candidate timing signal SG1 overlaps the timing t7 will be considered. If the A/D converter 20 is operated using the conversion candidate timing signal SG1 as it is as the conversion timing signal SG4, since the operation timing of the A/D conversion of the A/D converter 20 overlaps the occurrence timing of the switching noise, the switching noise affects the A/D conversion operation of the A/D converter 20. Thus, there is a possibility that the A/D converter 20 operates erroneously, and it becomes difficult to obtain an accurate digital value.

Therefore, in the present embodiment, as illustrated in FIG. 3, the switch timing adjustment circuit 40 calculates a timing t11 that is, later than the timing t8 as the timing that does not overlap the timings t7 and t8 and the period T78 between both timings. Moreover, the switch timing adjustment circuit 40 shifts the rising timing of the conversion candidate timing signal SG1 near the timing t7 to the calculated timing t11.

Figure 4:
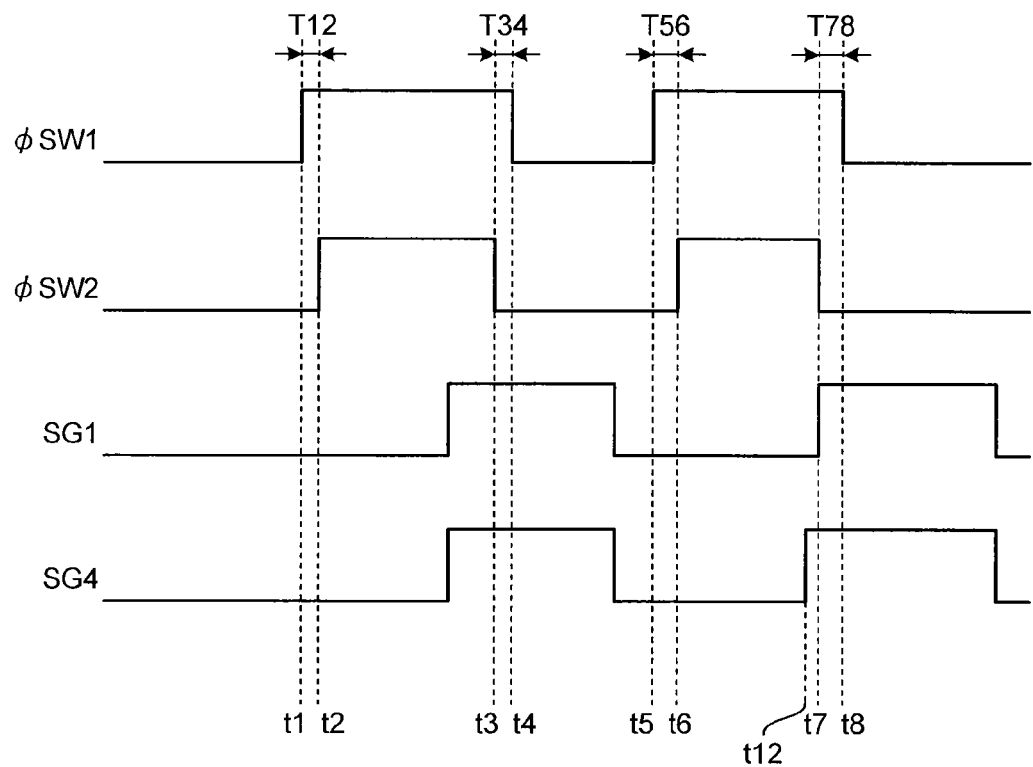
FIG. 4 is a diagram illustrating an operation of the switch timing adjustment circuit according to the first embodiment.

Alternatively, in the present embodiment, as illustrated in FIG. 4, the switch timing adjustment circuit 40 calculates a timing t12 that is, earlier than the timing t7 as a timing that does not overlap the timings t7 and t8 and the period T78 between both timings. Moreover, the switch timing adjustment circuit 40 shifts the rising timing of the conversion candidate timing signal SG1 near the timing t7 to the calculated timing t12.

As above, in the first embodiment, when the transition timing of the conversion candidate timing signal SG1 overlaps the transition timing of the first switching signal φSW1 or the transition timing of the second switching signal φSW2, the conversion timing adjusting unit 42 generates the conversion timing signal SG4 by adjusting the conversion candidate timing signal SG1 so that the transition timing of the conversion candidate timing signal SG1 does not overlap the transition timing of the first switching signal φSW1, the transition timing of the second switching signal φSW2, and a period in which both the first switching signal φSW1 and the second switching signal φSW2 are in the non-active level. In this way, since the rising timing of the conversion timing signal SG4 can be made not to overlap the occurrence timing of the switching noise, it is possible to suppress the influence of the switching noise occurring with the switching of the DC/DC converter 10 on the A/D conversion operation of the A/D converter 20. That is, it is possible to suppress the influence of noise occurring with the switching of the DC/DC converter 10. As a result, it is possible to suppress an erroneous operation of the A/D converter 20 and to easily obtain an accurate digital value. Thus, it is easy to perform control so that the power circuit 1 outputs a DC voltage of an appropriate level.

Moreover, in the first embodiment, since the control circuit 30 performs PWM control on each of the first switching signal φSW1 and the second switching signal φSW2, the duty ratios of the first switching signal φSW1 and the second switching signal φSW2 are changed dynamically, and the on/off timing is also changed dynamically within one period of each of the switching signals. In contrast, the conversion timing adjusting unit 42 calculates a timing (for example, the timing t11 illustrated in FIG. 3 and the timing t12 illustrated in FIG. 4) that does not overlap the transition timing of the first switching signal φSW1 and the transition timing of the second switching signal φSW2. The conversion timing adjusting unit 42 generates the conversion timing signal SG4 by shifting the transition timing of the conversion candidate timing signal SG1 to the calculated timing. In this way, when the on/off timing is changed dynamically within one period of each of the first switching signal φSW1 and the second switching signal φSW2, it is possible to dynamically adjust the rising timing of the conversion timing signal SG4 so as not to overlap the occurrence timing of the switching noise. That is, as compared to a case where the rising timing of the conversion timing signal SG4 is shifted to a fixed timing, it is possible to suppress the rising timing of the conversion timing signal SG4 from overlapping the occurrence timing of the switching noise.

Moreover, in the first embodiment, the determining unit 41 receives the control signal SG3 from the control circuit 30 as the signal associated with PWM control. The determining unit 41 estimates the transition timing of the first switching signal φSW1 and the transition timing of the second switching signal φSW2 based on the control signal SG3. Moreover, the determining unit 41 receives the control signal SG0 associated with the conversion candidate timing signal SG1 that serves as the candidate for the conversion timing signal SG4 from the outside (for example, a high-level controller that is, not illustrated). The determining unit 41 estimates the transition timing of the conversion candidate timing signal SG1 based on the control signal SG0. In this way, the determining unit 41 can determine whether the transition timing of the conversion candidate timing signal SG1 overlaps the transition timing of the first switching signal φSW1 or the transition timing of the second switching signal φSW2 before the switching of the DC/DC converter 10 is performed actually.

Figure 5:
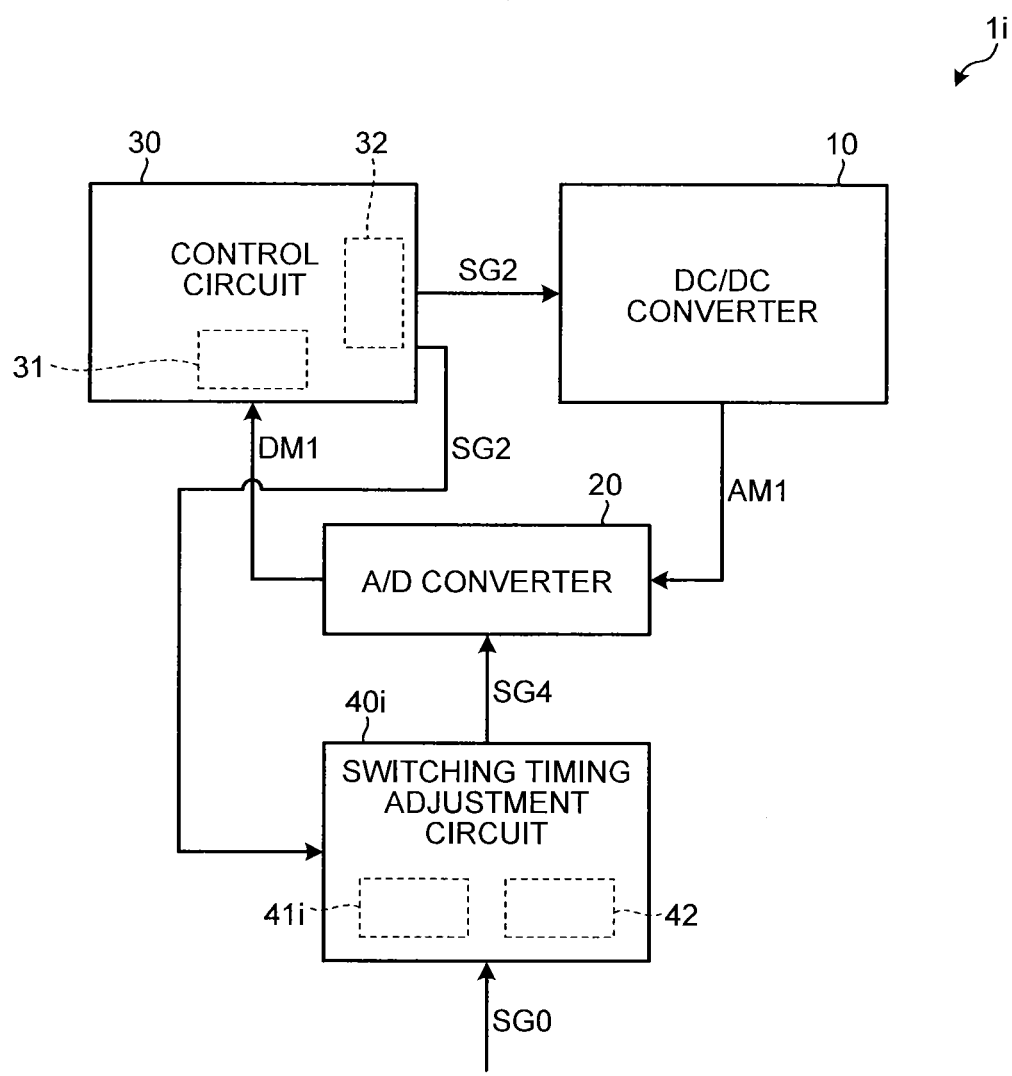
FIG. 5 is a diagram illustrating a configuration of a power circuit according to a modification example of the first embodiment.

As illustrated in FIG. 5, a switch timing adjustment circuit 40i of a power circuit 1i may receive the control signal SG2 for performing PWM control from the control circuit 30 instead of the control signal SG3 as the signal associated with the PWM control. In this case, in the control circuit 30, rather than the deciding unit 31 supplies the control signal SG3 to the switch timing adjustment circuit 40, the digital PWM control unit 32 supplies the control signal SG2 to the DC/DC converter 10 and the switch timing adjustment circuit 40. A determining unit 41i of the switch timing adjustment circuit 40i receives the control signal SG2 from the control circuit 30 and estimates the transition timing of the first switching signal φSW1 and the transition timing of the second switching signal φSW2 based on the control signal SG2. In this case, the determining unit 41i can also determine whether the transition timing of the conversion candidate timing signal SG1 overlaps the transition timing of the first switching signal φSW1 or the transition timing of the second switching signal φSW2 before the switching of the DC/DC converter 10 is performed actually.

Figure 6:
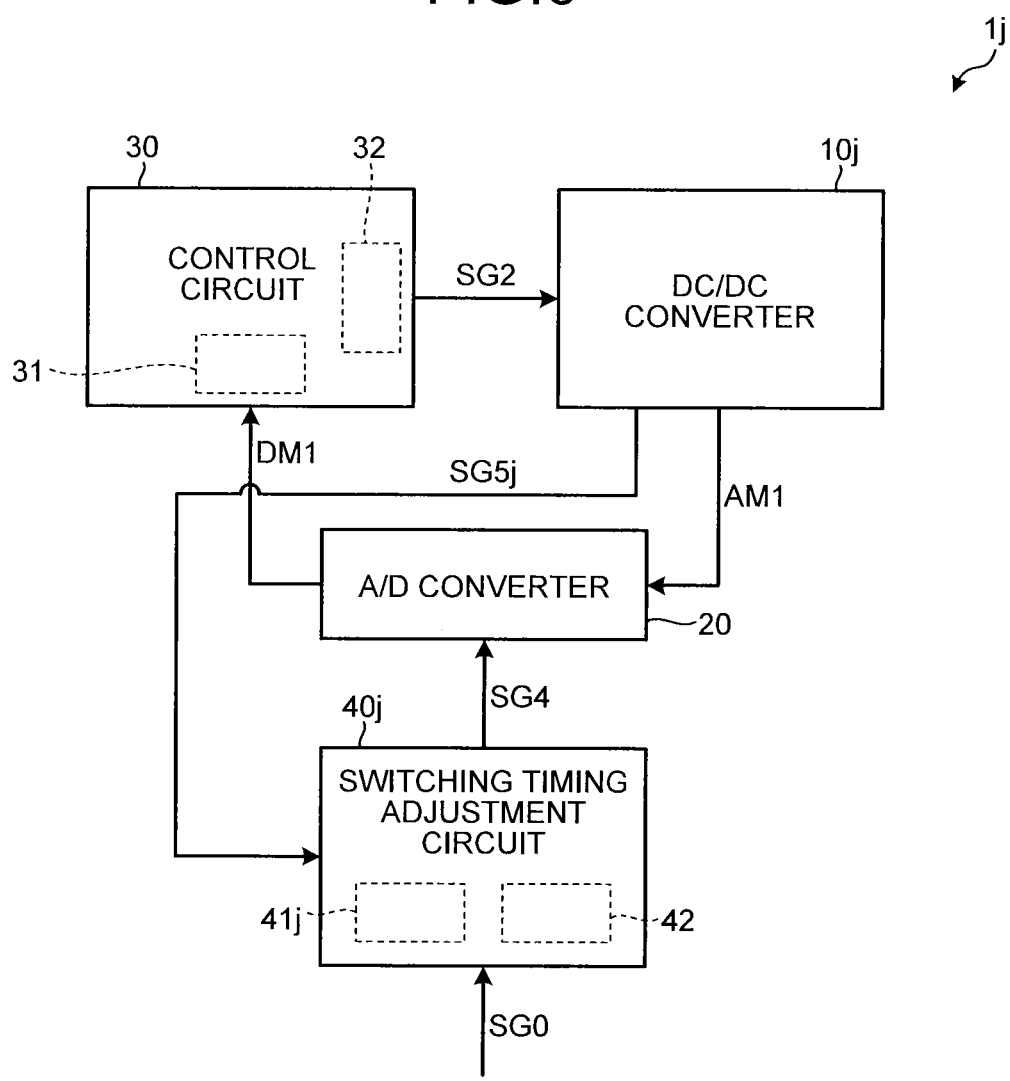
FIG. 6 is a diagram illustrating a configuration of a power circuit according to another modification example of the first embodiment.
Figure 7:
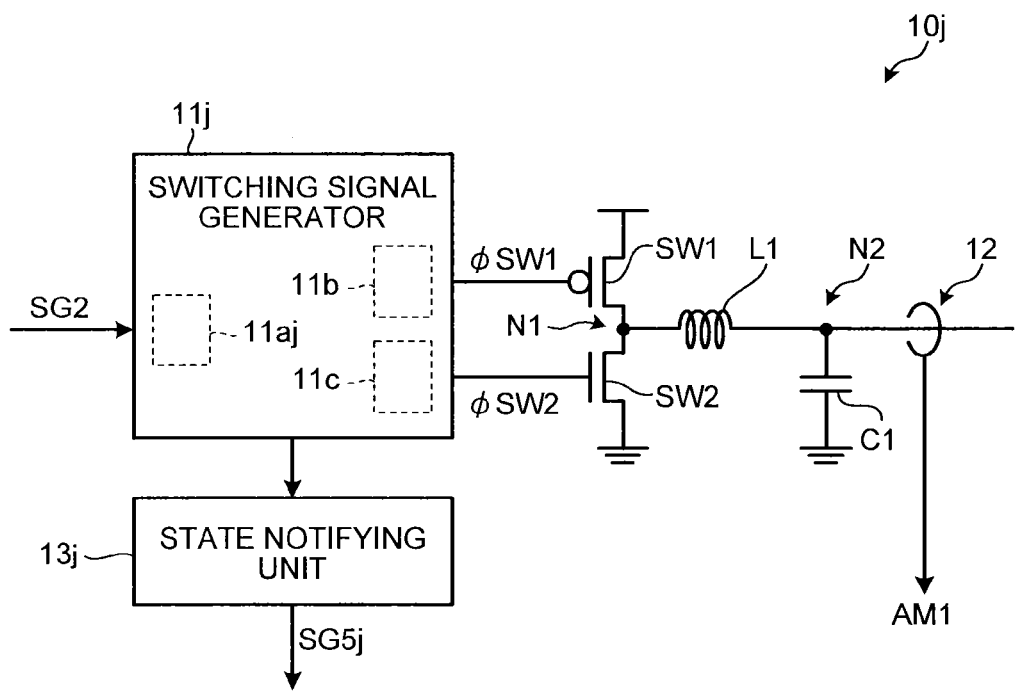
FIG. 7 is a diagram illustrating a configuration of a DC/DC converter according to another modification example of the first embodiment.

Alternatively, as illustrated in FIG. 6, a switch timing adjustment circuit 40j of a power circuit 1j may receive a signal SG5j for controlling switching from a DC/DC converter 10j instead of the control signal SG3 as the signal associated with the PWM control. In this case, as illustrated in FIG. 7, a DC/DC converter 10j may further include a state notifying unit 13j. A decoding unit 11aj of a switching signal generator 11j extracts a control value for the switch SW1 from the decoding result and supplies the control value to a switching signal generating unit 11b and the state notifying unit 13j. The decoding unit 11aj extracts a control value for the switch SW2 from the decoding result and supplies the control value to a switching signal generating unit 11c and the state notifying unit 13j. The state notifying unit 13j supplies a control signal SG5j including the control values for the switch SW1 and the control value for the switch SW2 to the switch timing adjustment circuit 40j. That is, the state notifying unit 13j notifies the switch timing adjustment circuit 40j of a state (an on/off operation state) to be expected in future for the DC/DC converter 10j via the control signal SG5j. The determining unit 41j of the switch timing adjustment circuit 40j receives the control signal SG5j from the DC/DC converter 10j and estimates the transition timing of the first switching signal φSW1 and the transition timing of the second switching signal φSW2 based on the control signal SG5j. In this case, the determining unit 41j can also determine whether the transition timing of the conversion candidate timing signal SG1 overlaps the transition timing of the first switching signal φSW1 or the transition timing of the second switching signal φSW2 before the switching of the DC/DC converter 10 is performed actually.

Second Embodiment

Next, a power circuit 100 according to a second embodiment will be described. In the following description, portions different from those of the first embodiment will be described primarily.

Figure 8:
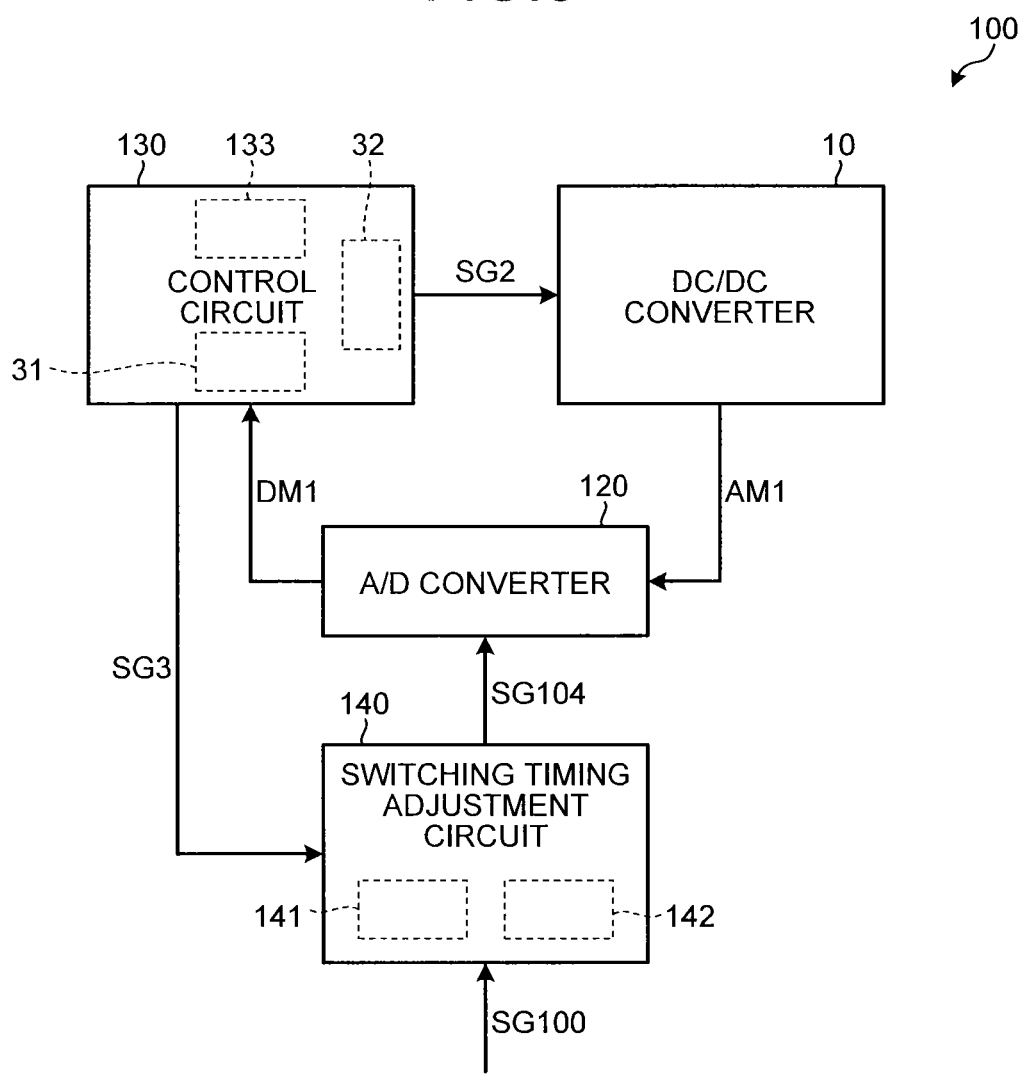
FIG. 8 is a diagram illustrating a configuration of a power circuit according to a second embodiment.

In the first embodiment, the A/D converter 20 has performed one cycle of A/D conversion in synchronization with one conversion timing signal SG4. In contrast, in the second embodiment, an A/D converter 120 is a successive approximation register (SAR; successive conversion)-type A/D converter, and as illustrated in FIG. 8, performs one cycle of A/D conversion sequentially in synchronization with a plurality of conversion timing signals SG104-1 to SG104-5 of a group of conversion timing signals SG104.

Figure 9:
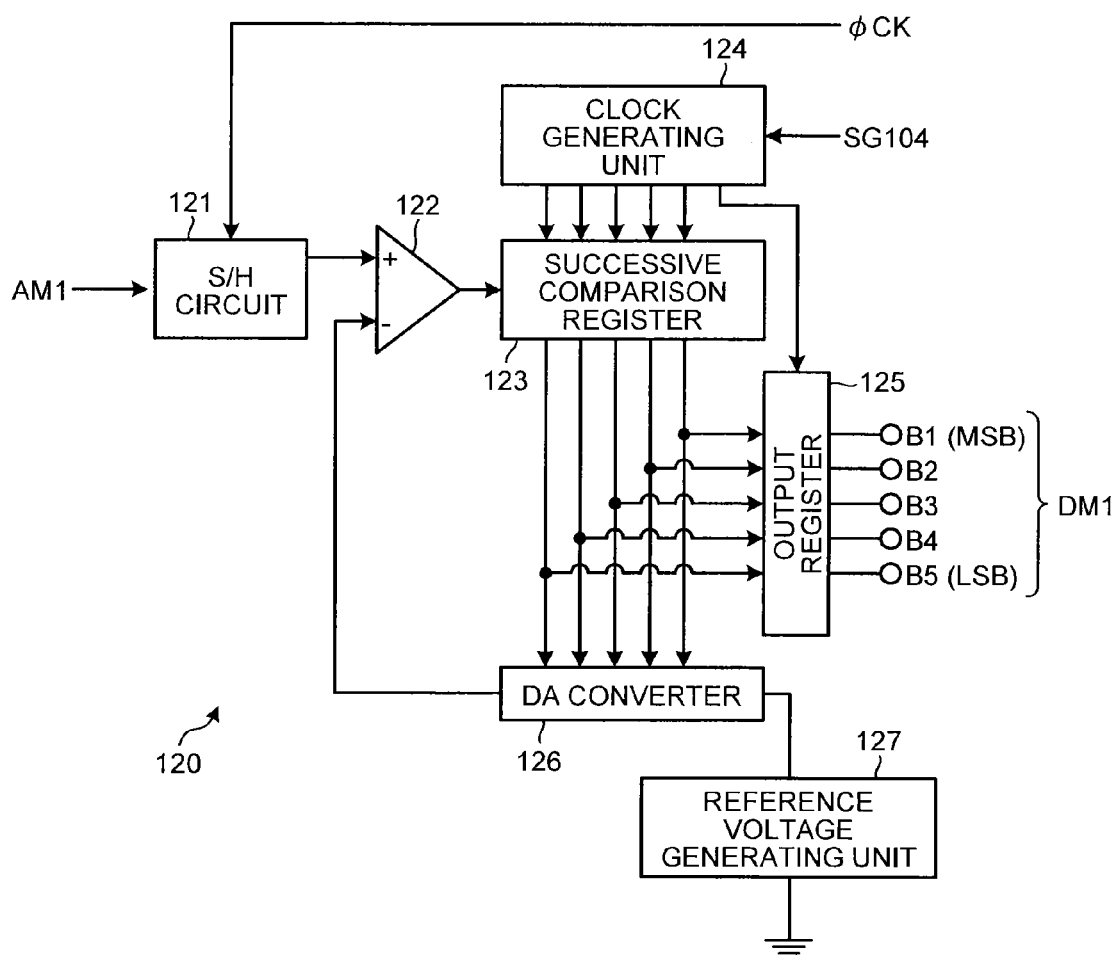
FIG. 9 is a diagram illustrating a configuration of an A/D converter according to the second embodiment.

For example, as illustrated in FIG. 9, the A/D converter 120 of the power circuit 100 includes a sample-and-hold circuit (S/H circuit) 121, a comparator 122, a successive comparison register 123, a clock generating unit 124, an output register 125, a DA converter 126, and a reference voltage generating unit 127. The S/H circuit 121 samples and holds an analog monitoring value AM1 in synchronization with a sampling clock φCK. The comparator 122 compares the analog monitoring value AM1 held in the S/H circuit 121 with a reference value supplied from the DA converter 126 and outputs the comparison result to the successive comparison register 123. The successive comparison register 123 shifts the comparison result output from the comparator 122 by one stage in synchronization with a clock supplied from the clock generating unit 124. The clock generating unit 124 supplies the plurality of conversion timing signals SG104-1 to SG104-5 to the registers at the respective stages of the successive comparison register 123 as a clock. The clock generating unit 124 generates an output clock from the plurality of conversion timing signals SG104-1 to SG104-5 and supplies the output clock to the output register 125. The DA converter 126 generates a reference value using the reference voltage received from the reference voltage generating unit 127 and the value output from the registers at the respective stages of the successive comparison register 123 and supplies the reference value to the comparator 122. In this way, the A/D converter 120 performs one cycle of A/D conversion sequentially in synchronization with the plurality of conversion timing signals SG104-1 to SG104-5 and outputs bit values B1 to B5 output from the registers at the respective stages of the successive comparison register 123 in synchronization with the output clock to a control circuit 130 (see FIG. 8) as a digital monitoring value DM1.

Figure 10:
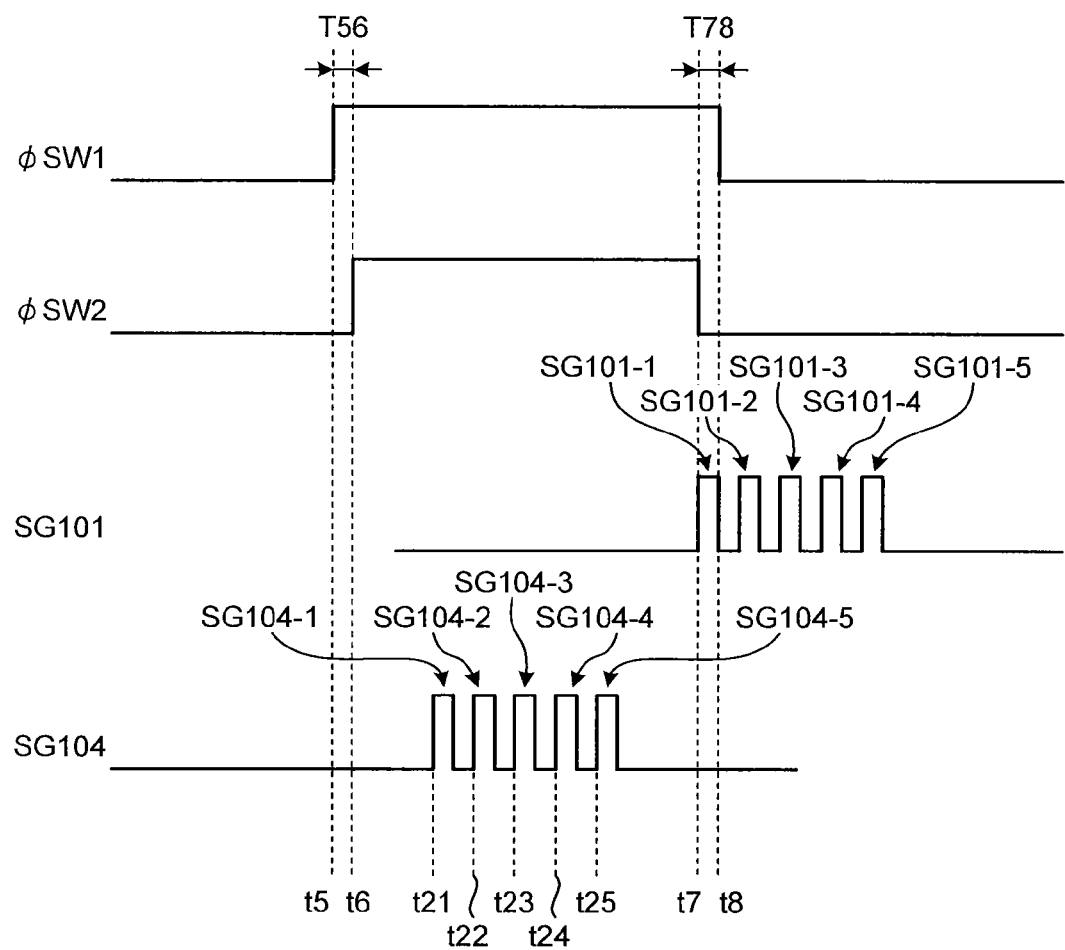
FIG. 10 is a diagram illustrating an operation of a switch timing adjustment circuit according to the second embodiment.
Figure 11:
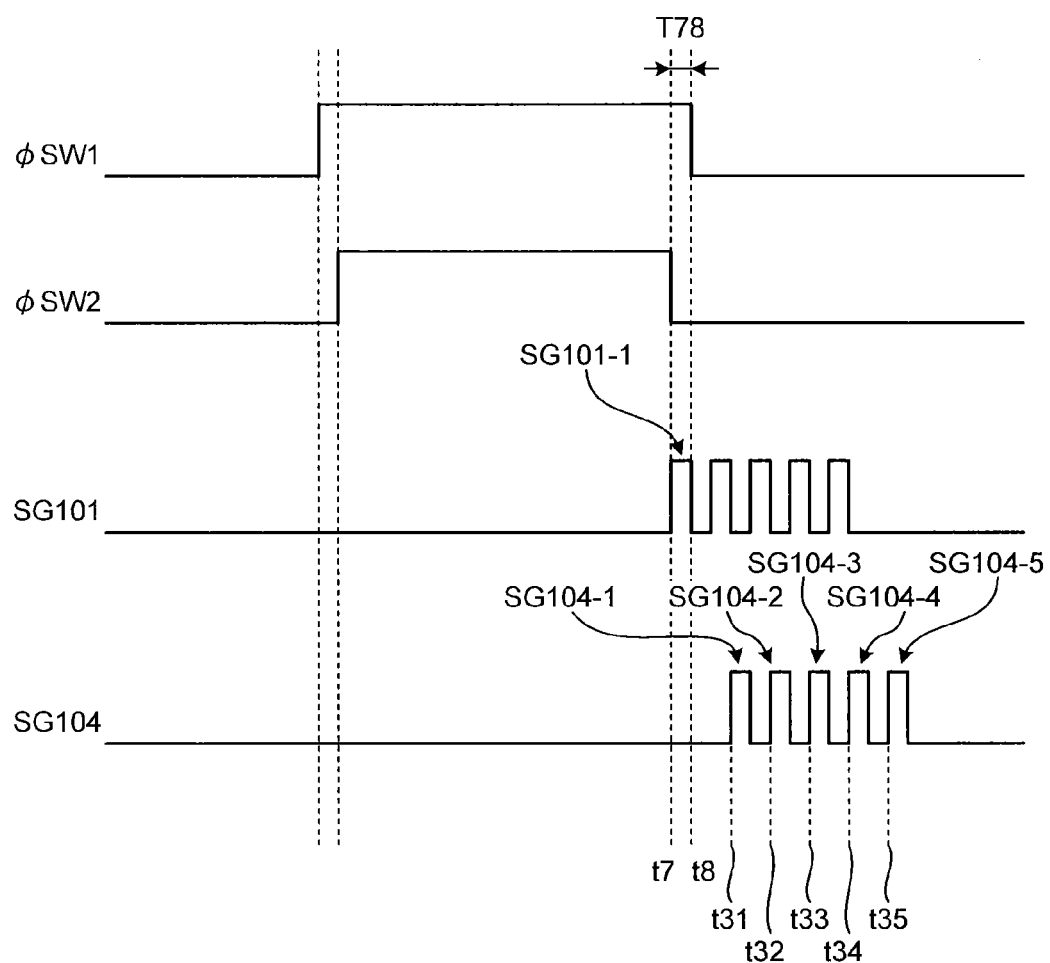
FIG. 11 is a diagram illustrating an operation of the switch timing adjustment circuit according to the second embodiment.
Figure 12:
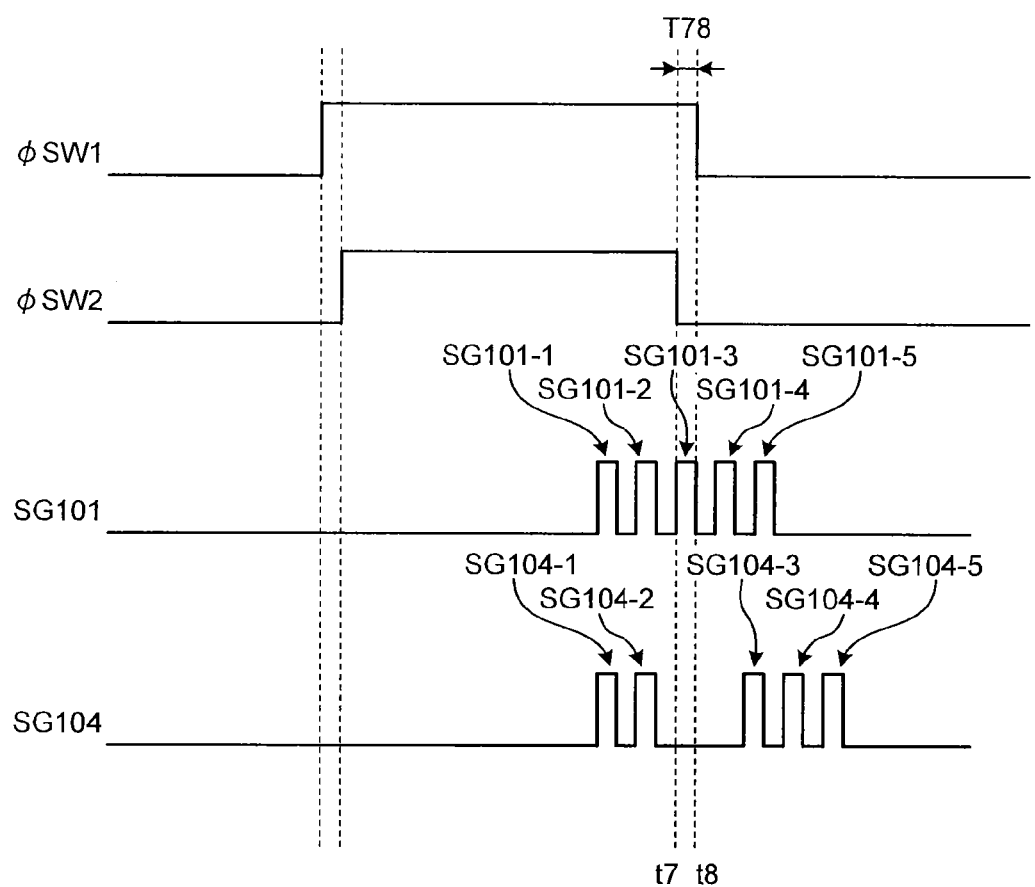
FIG. 12 is a diagram illustrating an operation of the switch timing adjustment circuit according to the second embodiment.

FIGS. 10 to 12 illustrate operation waveforms of a case where the A/D converter 120 performs one cycle of A/D conversion sequentially in synchronization with five clocks, namely five conversion timing signals SG104-1 to SG104-5.

When timing adjustment is not performed, for example, in the case illustrated in FIG. 10, the rising timing of a conversion candidate timing signal SG101-1 overlaps a timing t7 at which the switch SW2 is turned off or a period T78 where both the switches SW1 and SW2 are turned off.

Here, in the switch timing adjustment circuit 140, the determining unit 141 receives a control signal SG100 associated with a plurality of conversion candidate timing signals SG101-1 to SG101-5 (see FIG. 10) that serve as the candidates for the plurality of conversion timing signals SG104-1 to SG104-5 from the outside (for example, a high-level controller that is not illustrated). The determining unit 141 estimates the transition timings of the plurality of conversion candidate timing signals SG101-1 to SG101-5 based on the control signal SG100. Moreover, the determining unit 141 determines whether the transition timing of each of the conversion candidate timing signals SG101-1 to SG101-5 overlaps the transition timing of the first switching signal φSW1 or the transition timing of the second switching signal φSW2 using the estimated contents and supplies the determination result to the conversion timing adjusting unit 142.

When the determination result shows that the transition timing of at least one of the conversion candidate timing signals SG101-1 to SG101-5 overlaps the transition timing of the first switching signal φSW1 or the transition timing of the second switching signal φSW2, the conversion timing adjusting unit 142 adjusts the conversion candidate timing signals SG101-1 to SG101-5 so that the transition timings of the conversion candidate timing signals SG101-1 to SG101-5 do not overlap the transition timing of the first switching signal φSW1 and the transition timing of the second switching signal φSW2 to thereby generate the plurality of conversion timing signals SG104-1 to SG104-5.

For example, the conversion timing adjusting unit 142 calculates timings (for example, timings t21 to t25 illustrated in FIG. 10 and timings t31 to t35 illustrated in FIG. 11) that do not overlap the transition timing of the first switching signal φSW1 and the transition timing of the second switching signal φSW2. The conversion timing adjusting unit 142 generates the plurality of conversion timing signals SG104-1 to SG104-5 by shifting the transition timings of the plurality of conversion candidate timing signals SG1 uniformly (wholly) to the calculated timings (see FIGS. 11 and 12).

In this case, in order to reduce the influence of noise as much as possible, for example, the conversion timing adjusting unit 142 may shift the plurality of conversion candidate timing signals SG101-1 to SG101-5 uniformly so that the rising timing of the conversion candidate timing signal SG101-3 in the middle of the plurality of conversion candidate timing signals SG101-1 to SG101-5 is near an intermediate timing (t6+t7)/2 between the ending timing t6 of the period T56 and the starting timing t7 of the period T78 (see FIG. 10). When a plurality of switching operations occurs within one cycle of the A/D conversion operation, a timing that is furthest from these switching operations may be calculated and the clock may be shifted.

Alternatively, for example, the conversion timing adjusting unit 142 generates the plurality of conversion timing signals SG104-1 to SG104-5 by halting the plurality of conversion candidate timing signals SG101-1 to SG101-5 in a period (for example, the period T78 illustrated in FIG. 12) where both the first switching signal φSW1 and the second switching signal φSW2 are in the non-active level and restarting the conversion candidate timing signals after the elapse of the period (see FIG. 12). In this case, although the clock (conversion timing signal) is not supplied continuously, since in the A/D converter 120, the successive comparison register 123 (see FIG. 9) holds the values, no problem occurs in the A/D conversion operation.

As above, in the second embodiment, when the transition timing of any one of the plurality of conversion candidate timing signals SG101-1 to SG101-5 overlaps the transition timing of the first switching signal φSW1 or the transition timing of the second switching signal φSW2, the conversion timing adjusting unit 142 adjusts the conversion candidate timing signals SG101-1 to SG101-5 so that the transition timing of any one of the conversion candidate timing signals SG101-1 to SG101-5 does not overlap the transition timing of the first switching signal φSW1, the transition timing of the second switching signal φSW2, and a period where both the first switching signal φSW1 and the second switching signal φSW2 are in the non-active level to thereby generate the plurality of conversion timing signals SG104-1 to SG104-5. In this way, when the A/D converter 120 is a successive conversion-type A/D converter, it is possible to make all of the rising timings of the plurality of conversion timing signals SG104-1 to SG104-5 not to overlap the occurrence timing of the switching noise. Thus, it is possible to suppress the switching noise occurring with the switching of the DC/DC converter 10 from affecting the A/D conversion operation of the A/D converter 120.

Moreover, in the second embodiment, for example, the conversion timing adjusting unit 142 calculates timings (for example, the timings t21 to t25 illustrated in FIG. 10 and the timings t31 to t35 illustrated in FIG. 11) that do not overlap the transition timing of the first switching signal φSW1 and the transition timing of the second switching signal φSW2. The conversion timing adjusting unit 142 generates the plurality of conversion timing signals SG104-1 to SG104-5 by shifting the transition timings of the plurality of conversion candidate timing signals SG1 uniformly (wholly) to the calculated timing (see FIGS. 11 and 12). In this way, when the A/D converter 120 is a successive conversion-type A/D converter, it is possible to dynamically adjust the rising timings of all of the plurality of conversion timing signals SG104-1 to SG104-5 so as not to overlap the occurrence timing of the switching noise.

Alternatively, for example, the conversion timing adjusting unit 142 generates the plurality of conversion timing signals SG104-1 to SG104-5 by halting the plurality of conversion candidate timing signals SG101-1 to SG101-5 in a period (for example, the period T78 illustrated in FIG. 12) where both the first switching signal φSW1 and the second switching signal φSW2 are in the non-active level and restarting the conversion candidate timing signals after the elapse of the period (see FIG. 12). In this way, when the A/D converter 120 is a successive conversion-type A/D converter, it is also possible to dynamically adjust the rising timings of all of the plurality of conversion timing signals SG104-1 to SG104-5 so as not to overlap the occurrence timing of the switching noise.

When the plurality of conversion candidate timing signals includes a first conversion candidate timing signal and a second conversion candidate timing signal of which the amount of allowable noise is smaller than that of the first conversion candidate timing signal, the switch timing adjustment circuit 140 may selectively perform the timing adjustment on the second conversion candidate timing signal having the smaller amount of allowable noise.

For example, like the SAR-type A/D converter 120, when A/D conversion is performed using a plurality of conversion timing signals, in the DC/DC converter 10, the amounts of noise allowed at the respective operation timings are different. In the DC/DC converter 10, there is a case where the amount of noise allowed at a timing at which a lower bit is determined is greater than the amount of noise allowed at a timing at which an upper bit is determined. In this case, the conversion timing adjusting unit 142 allows a state (see FIG. 15) where the conversion candidate timing signal SG101-5 corresponding to the lower bit overlaps the timing t7, the timing t8, or the period T78 and does not perform timing adjustment in particular. In contrast, when the conversion candidate timing signal SG101-1 corresponding to the upper bit overlaps the timing t7, the timing t8, or the period T78 (see FIG. 13), the conversion timing adjusting unit 142 performs timing adjustment as illustrated in FIGS. 10 to 13, for example.

For example, like the SAR-type A/D converter 120, when A/D conversion is performed using a plurality of conversion timing signals, in the A/D converter 120, the amounts of noise allowed at the respective operation timings are different. In the A/D converter 120, there is a case where the amount of noise allowed at a timing at which an upper bit is determined is greater than the amount of noise allowed at a timing at which a lower bit is determined. In this case, the conversion timing adjusting unit 142 allows a state (see FIG. 13) where the conversion candidate timing signal SG101-1 corresponding to the upper bit overlaps the timing t7, the timing t8, or the period T78 and does not perform timing adjustment in particular. In contrast, when the conversion candidate timing signal SG101-5 corresponding to the lower bit overlaps the timing t7, the timing t8, or the period T78 (see FIG. 15), the conversion timing adjusting unit 142 performs timing adjustment as illustrated in FIGS. 10 to 13, for example.

As above, when a plurality of conversion timing signals is required, and the amounts of noise allowed for the respective conversion timing signals are different, it is possible to perform timing adjustment selectively on the conversion timing signal which affect accuracy so that sufficient accuracy is secured. By doing so, it is possible to reduce the frequency of the operation of shifting the plurality of conversion timing signals.

Alternatively, when it is not possible to shift the plurality of conversion timing signals SG104-1 to SG104-5 so much due to predetermined restrictions such as relation with the operation timings of other circuits, the switch timing adjustment circuit 140 may perform the operation as illustrated in FIGS. 13 to 16.

Figure 13:
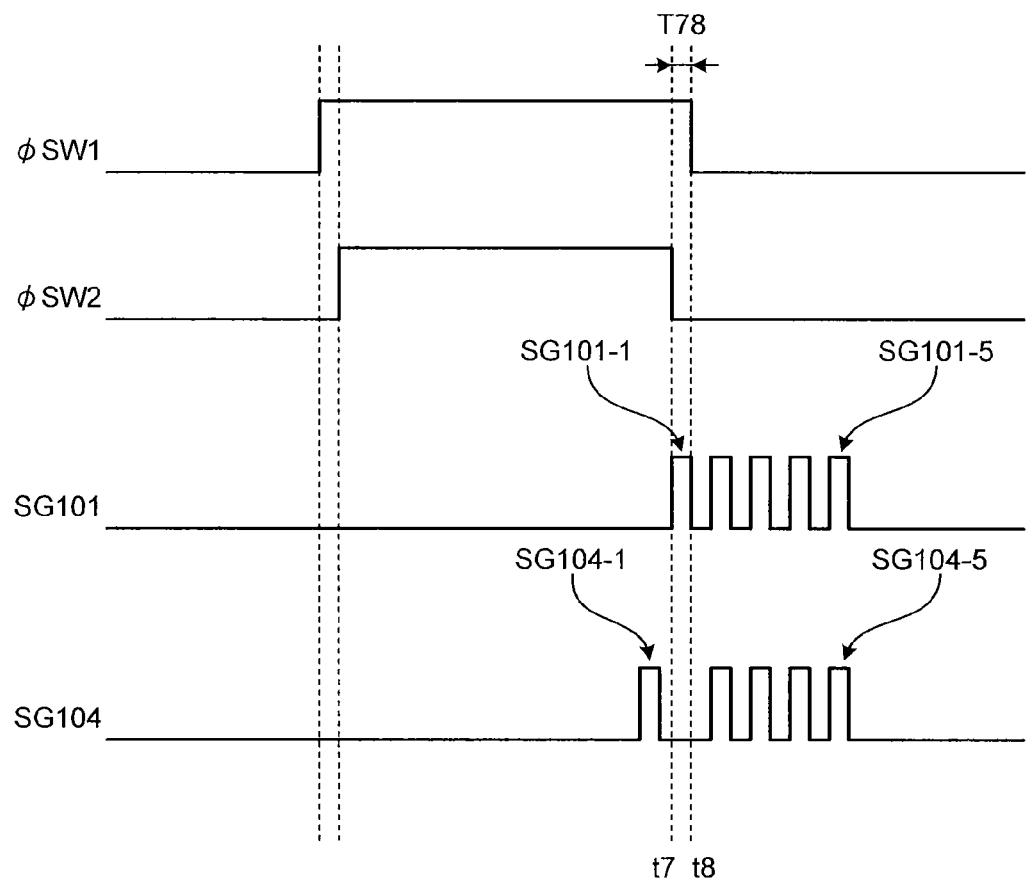
FIG. 13 is a diagram illustrating an operation of a switch timing adjustment circuit according to a modification example of the second embodiment.
Figure 14:
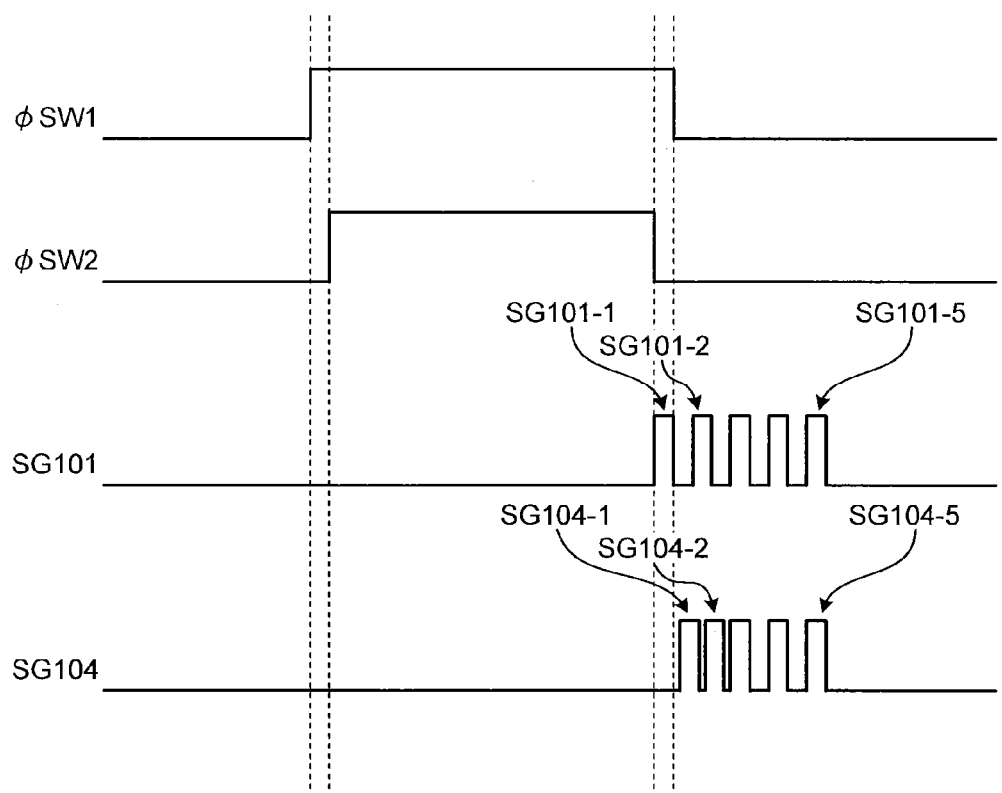
FIG. 14 is a diagram illustrating an operation of the switch timing adjustment circuit according to the modification example of the second embodiment.

For example, when the conversion candidate timing signal SG101-1 overlaps the timing t7, the timing t8, or the period T78, the conversion timing adjusting unit 142 may generate the plurality of conversion timing signals SG104-1 to SG104-5 by selectively shifting the overlapping conversion candidate timing signal SG101-1 (see FIG. 13). Alternatively, the conversion timing adjusting unit 142 may generate the plurality of conversion timing signals SG104-1 to SG104-5 by shifting the overlapping conversion candidate timing signal SG101-1 and the adjacent conversion candidate timing signal SG101-2 (see FIG. 14).

Figure 15:
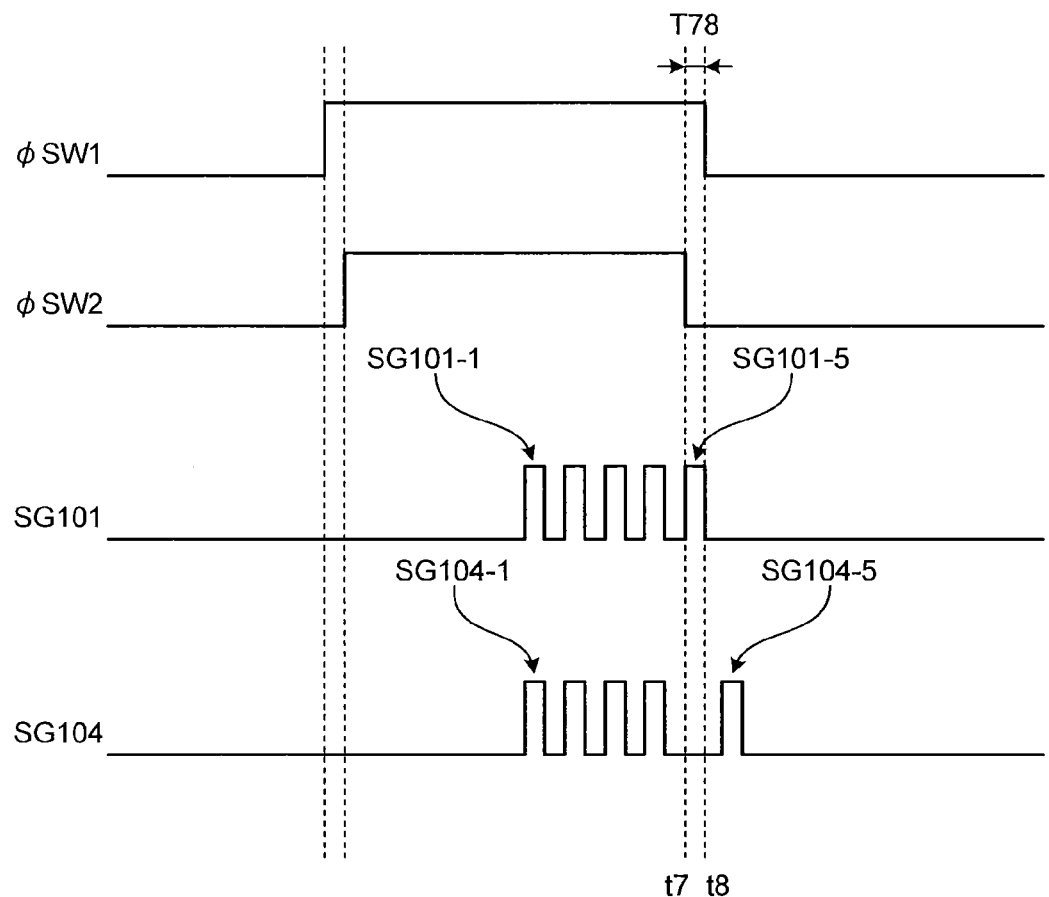
FIG. 15 is a diagram illustrating an operation of the switch timing adjustment circuit according to the modification example of the second embodiment.
Figure 16:
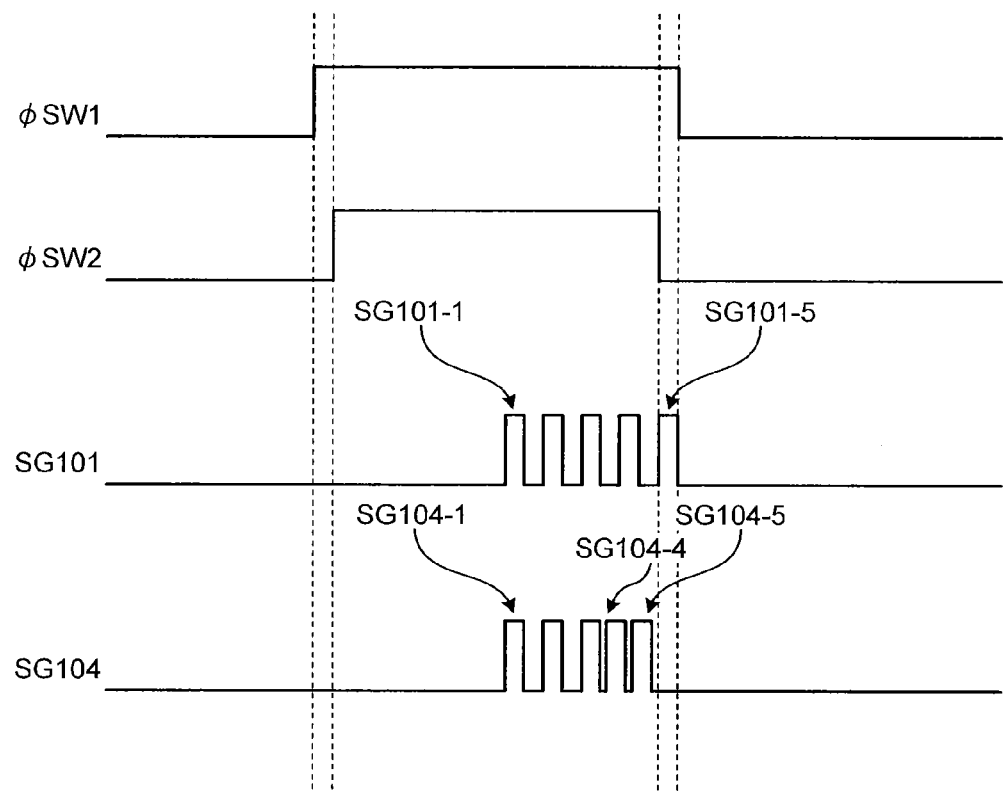
FIG. 16 is a diagram illustrating an operation of the switch timing adjustment circuit according to the modification example of the second embodiment.

For example, when the conversion candidate timing signal SG101-5 overlaps the timing t7, the timing t8, or the period T78, the conversion timing adjusting unit 142 may generate the plurality of conversion timing signals SG104-1 to SG104-5 by selectively shifting the overlapping conversion candidate timing signal SG101-5 (see FIG. 15). Alternatively, the conversion timing adjusting unit 142 may generate the plurality of conversion timing signals SG104-1 to SG104-5 by shifting the overlapping conversion candidate timing signal SG101-5 and the adjacent conversion candidate timing signal SG101-4 (see FIG. 16).

In this way, it is possible to reduce the number of signals to be shifted among the plurality of conversion timing signals by selectively shifting the overlapping conversion candidate timing signal and the adjacent conversion candidate timing signal.

Third Embodiment

Next, a power circuit 200 according to a third embodiment will be described. In the following description, portions different from those of the first embodiment will be described primarily.

In the first embodiment, the conversion candidate timing signal SG1 is adjusted so that the A/D conversion timing does not overlap the transition timing of the first switching signal φSW1 and the transition timing of the second switching signal φSW2. In contrast, in the third embodiment, rather than adjusting the conversion candidate timing signal SG1, the first switching signal φSW1 and the second switching signal φSW2 are adjusted.

Figure 17:
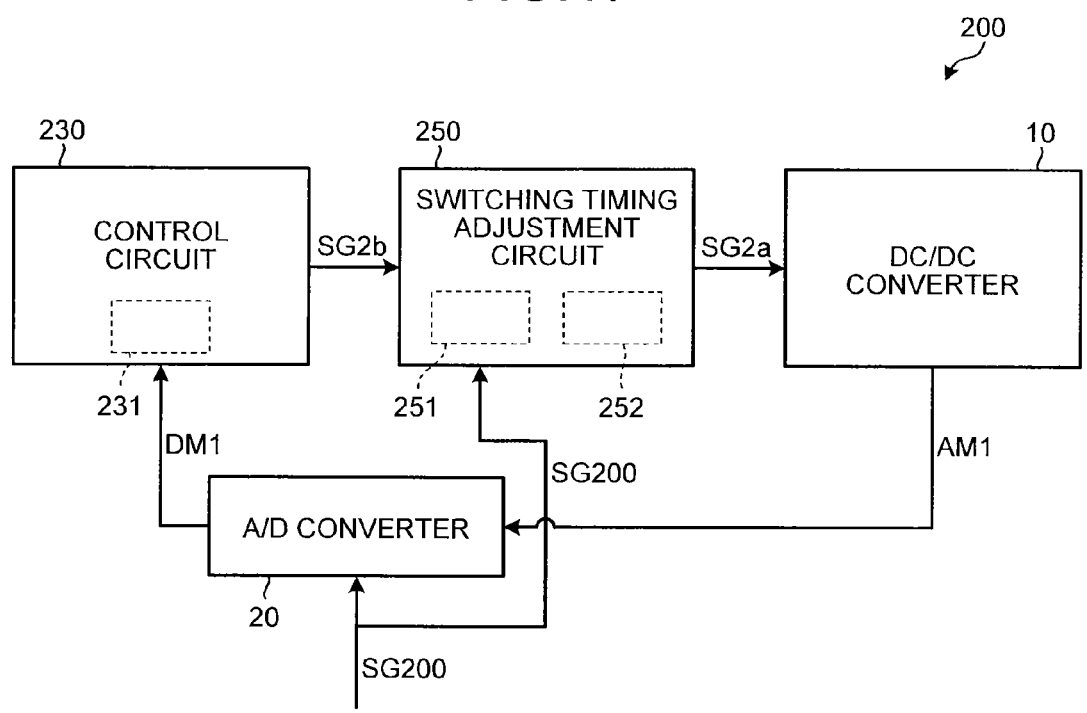
FIG. 17 is a diagram illustrating an operation of a switch timing adjustment circuit according to a third embodiment.

Specifically, as illustrated in FIG. 17, the power circuit 200 includes a control circuit 230 and a switch timing adjustment circuit 250. The control circuit 230 does not include the digital PWM control unit 32 (see FIG. 1), but the switch timing adjustment circuit 250 includes a digital PWM control unit 252.

The control circuit 230 performs PWM control on each of a first candidate switching signal φSW1b that serves as a candidate for a first switching signal φSW1a and a second candidate switching signal φSW2b that serves as a candidate for a second switching signal φSW2a using a digital monitoring value. That is, a deciding unit 231 acquires a digital monitoring value DM1 and decides a control content including an on/off timing of the first candidate switching signal φSW1b and an on/off timing of the second candidate switching signal φSW2b so that the digital monitoring value DM1 approaches a target value, that is, a DC voltage stepped down to a predetermined level is output from the DC/DC converter 10. The deciding unit 231 generates a control signal SG2b corresponding to the decided control content and supplies the control signal SG2b to the switch timing adjustment circuit 250.

The switch timing adjustment circuit 250 receives the control signal SG2b from the control circuit 230 and performs adjustment of the operation timings of the switches SW1 and SW2 (see FIG. 2) of the DC/DC converter 10 using the control signal SG2b. The switch timing adjustment circuit 250 includes a determining unit 251 and a digital PWM control unit 252.

The determining unit 251 receives the control signal SG2b from the control circuit 230 as a signal associated with the PWM control. The determining unit 251 estimates the transition timing of the first candidate switching signal φSW1b and the transition timing of the second candidate switching signal φSW2b based on the control signal SG2b. Moreover, the determining unit 251 receives a control signal SG200 associated with a conversion timing signal SG204 from the outside (for example, a high-level controller that is, not illustrated). The determining unit 251 estimates the transition timing of the conversion timing signal SG204 based on the control signal SG200. Moreover, the determining unit 251 determines whether the transition timing of the conversion timing signal SG204 overlaps the transition timing of the first candidate switching signal φSW1b or the transition timing of the second candidate switching signal φSW2b using the estimated content and supplies a determination result to the digital PWM control unit 252.

When the determination result shows that the transition timing of the conversion timing signal SG204 overlaps the transition timing of the first candidate switching signal φSW1b or the transition timing of the second candidate switching signal φSW2b, the digital PWM control unit (switch timing adjusting unit) 252 adjusts the first candidate switching signal φSW1b and the second candidate switching signal φSW2b so that the transition timings of the first and second candidate switching signals do not overlap the transition timing of the conversion timing signal SG204. Moreover, the digital PWM control unit 252 generates a control signal SG2a in which the adjusted result is reflected in the PWM control and supplies the control signal SG2a to the DC/DC converter 10.

Specifically, the digital PWM control unit 252 calculates a timing that does not overlap the transition timing of the conversion timing signal SG204 with respect to each of the first candidate switching signal φSW1b and the second candidate switching signal φSW2b and adjusts the first candidate switching signal φSW1a and the second candidate switching signal φSW2a by shifting each of the transition timing of the first candidate switching signal φSW1b and the transition timing of the second candidate switching signal φSW2b to the calculated timing.

Figure 18:
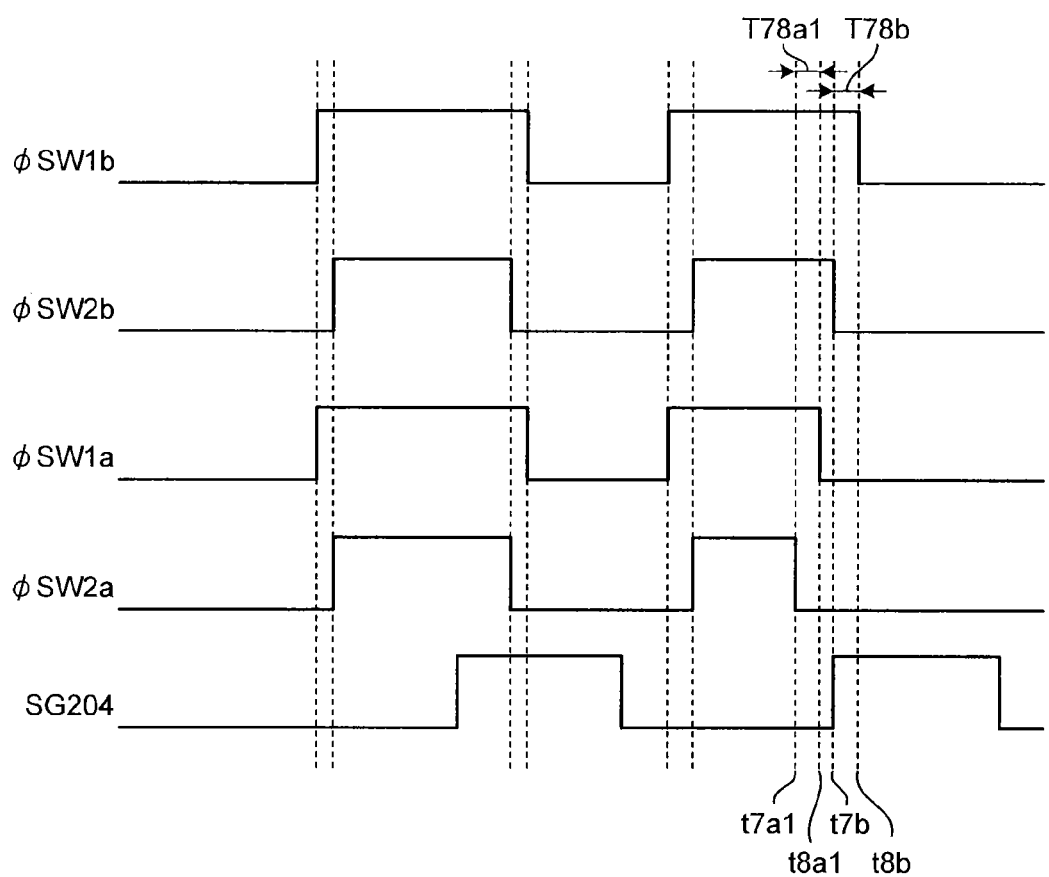
FIG. 18 is a diagram illustrating an operation of the switch timing adjustment circuit according to the third embodiment.

For example, when the rising timing of the conversion candidate timing signal SG204 overlaps a timing t7b, a timing t8b, or a period T78b between the timing t7b and the timing t8b, as illustrated in FIG. 18, the digital PWM control unit 252 calculates a timing t7a1 and a timing t8a1 that are earlier than the timing t7b as a timing that does not overlap the rising timing of the conversion candidate timing signal SG204. Moreover, the digital PWM control unit 252 shifts the transition timing t7b of the first candidate switching signal φSW1b and the transition timing t8b of the second candidate switching signal φSW2b to the timing t7a1 and the timing t8a1, respectively. In this way, the rising timing of the conversion candidate timing signal SG204 can be made not to overlap the transition timing t7a1 of the first switching signal φSW1a, the transition timing t8a1 of the second candidate switching signal φSW2a, and the period T78a1 between both transition timings.

Figure 19:
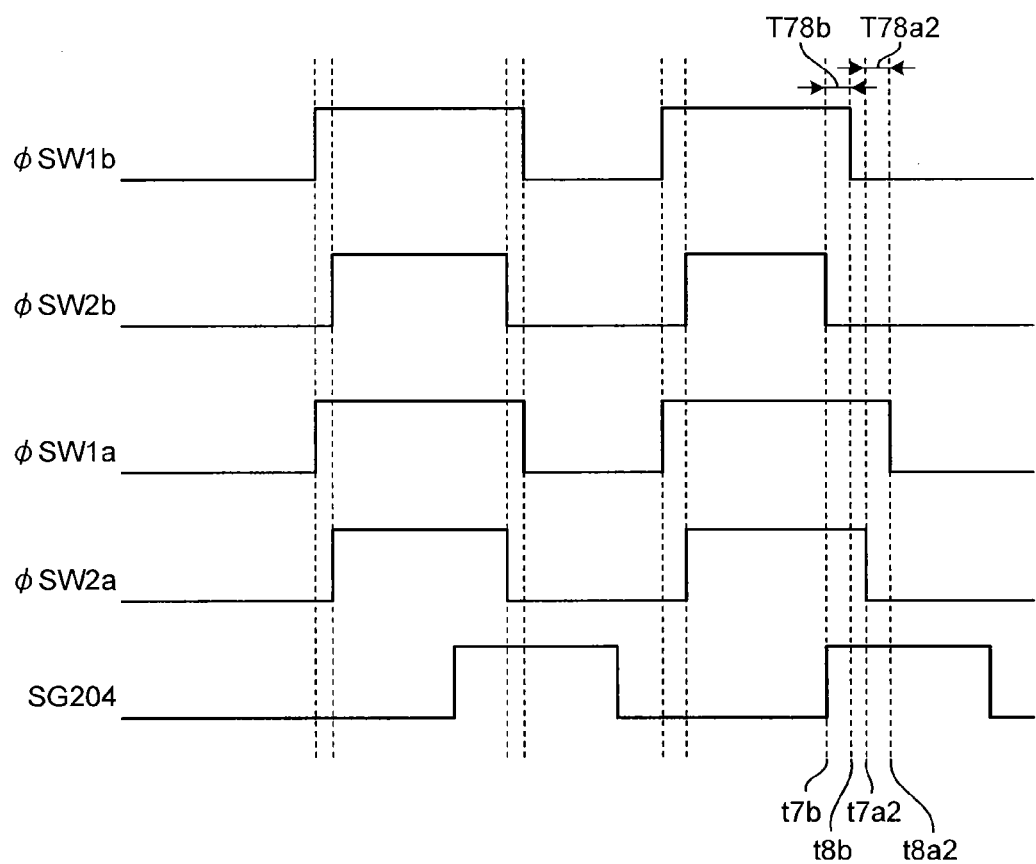
FIG. 19 is a diagram illustrating an operation of the switch timing adjustment circuit according to the third embodiment.

Alternatively, for example, when the rising timing of the conversion candidate timing signal SG204 overlaps the timing t7b, the timing t8b, or the period T78b between the timing t7b and the timing t8b, as illustrated in FIG. 19, the digital PWM control unit 252 calculates a timing t7a2 and a timing t8a2 that are later than the timing t7b as a timing that does not overlap the rising timing of the conversion candidate timing signal SG204. Moreover, the digital PWM control unit 252 shifts the transition timing t7b of the first candidate switching signal φSW1b and the transition timing t8b of the second candidate switching signal φSW2b to the timing t7a2 and the timing t8a2, respectively. In this way, the rising timing of the conversion candidate timing signal SG204 can be made not to overlap the transition timing t7a2 of the first switching signal φSW1a, the transition timing t8a2 of the second candidate switching signal φSW2a, and the period T78a2 between both transition timings.

As above, in the third embodiment, when the transition timing of the conversion timing signal SG204 overlaps the transition timing of the first candidate switching signal φSW1b or the transition timing of the second candidate switching signal φSW2b, the digital PWM control unit (switch timing adjusting unit) 252 adjusts the first candidate switching signal φSW1b and the second candidate switching signal φSW2b so that the transition timings of the first and second candidate switching signals do not overlap the transition timing of the conversion timing signal SG204 to thereby generate the first switching signal φSW1a and the second switching signal φSW2a. In this way, since the rising timing of the conversion timing signal SG204 can be made not to overlap the occurrence timing of the switching noise, it is possible to suppress the influence of the switching noise occurring with the switching of the DC/DC converter 10 on the A/D conversion operation of the A/D converter 20. That is, it is possible to reduce the influence of noise occurring with the switching of the DC/DC converter 10. As a result, it is possible to suppress an erroneous operation of the A/D converter 20 and to easily obtain an accurate digital value. Thus, it is easy to perform control so that the power circuit 1 outputs a DC voltage of an appropriate level.

Moreover, in the third embodiment, the digital PWM control unit 252 calculates the timing that does not overlap the transition timing of the conversion timing signal SG204 with respect to each of the first candidate switching signal φSW1b and the second candidate switching signal φSW2b and shifts the transition timing of the first candidate switching signal φSW1b and the transition timing of the second candidate switching signal φSW2b to the calculated timings to thereby adjust the first candidate switching signal φSW1a and the second candidate switching signal φSW2a. In this way, it is possible to dynamically adjust the rising timing of the conversion timing signal SG204 so as not to overlap the occurrence timing of the switching noise. That is, as compared to a case where the rising timing of the conversion timing signal SG204 is shifted to a fixed timing, it is possible to suppress the rising timing of the conversion timing signal SG204 from overlapping the occurrence timing of the switching noise.

The digital PWM control unit 252 may mask (halt) the clock to be supplied to the switching signal generator 11 in the DC/DC converter 10 immediately before the period T78b until the elapse of the period T78b in order to realize the timing adjustment as illustrated in FIG. 19. Since the clock is not supplied, the switching signal generator 11 stops, and the switches will not be switched in that period.

Fourth Embodiment

Next, a power circuit 300 according to a fourth embodiment will be described. In the following description, portions different from those of the first and second embodiments will be described primarily.

Figure 20:
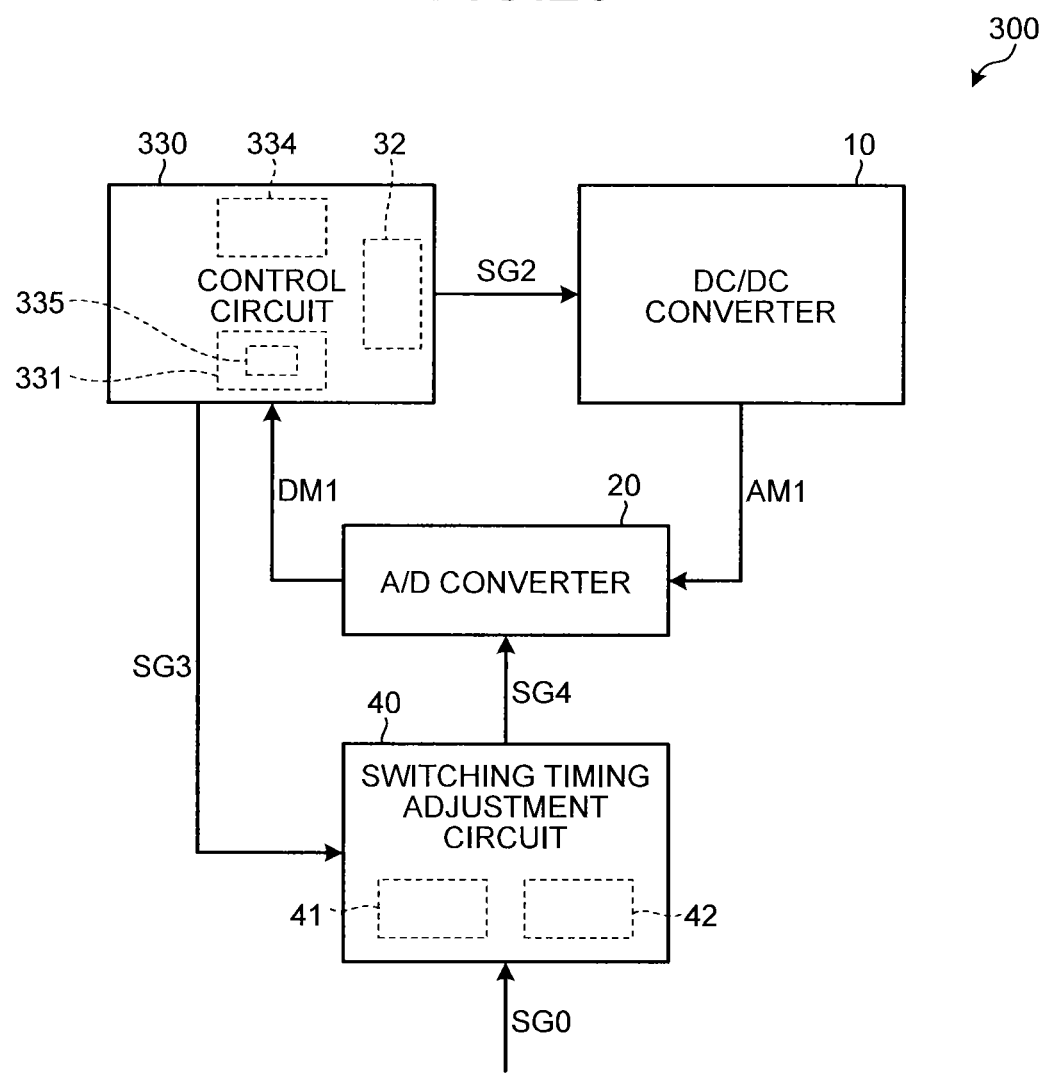
FIG. 20 is a diagram illustrating a configuration of a power circuit according to a fourth embodiment.

In the power circuit 300 illustrated in FIG. 20, when the operation timing of the A/D conversion is shifted (for example, when the timing adjustment illustrated in FIGS. 3, 4, and 10 to 16 is performed), a control circuit 330 changes control parameters in response to the shifting. For example, the control circuit 330 includes a deciding unit 331 and a changing unit 334. When the operation timing of the A/D conversion is shifted, that is, when the rising timing of the conversion candidate timing signal is shifted to generate a conversion timing signal, the changing unit 334 changes the control parameters used by the deciding unit 331, for example.

For example, a case where a differentiator 335 is included in the deciding unit 331 will be considered. The changing unit 334 changes a sampling interval to an actual sampling interval. Moreover, the deciding unit 331 uses a value obtained by dividing a difference between an A/D conversion result before one sampling operation of the differentiator 335 and an A/D conversion result of the current sampling operation or a difference between the respective A/D conversion results and a target value by the sampling interval (time) changed by the changing unit 334.

In the first and second embodiment, although the sampling interval of the differentiator 335 is a constant by assuming that the timing of the A/D conversion is uniform, the timing of the A/D conversion is changed actually.

Therefore, in the present embodiment, as described above, since the actual sampling interval is used as the sampling interval, the differentiator 335 can output a correct value. In this way, it is possible to suppress the influence on the control, of the shifting of the operation clock (the conversion timing signal) of the A/D converter.

Fifth Embodiment

Next, a power circuit 400 according to a fifth embodiment will be described. In the following description, portions different from those of the fourth embodiment will be described primarily.

Figure 21:
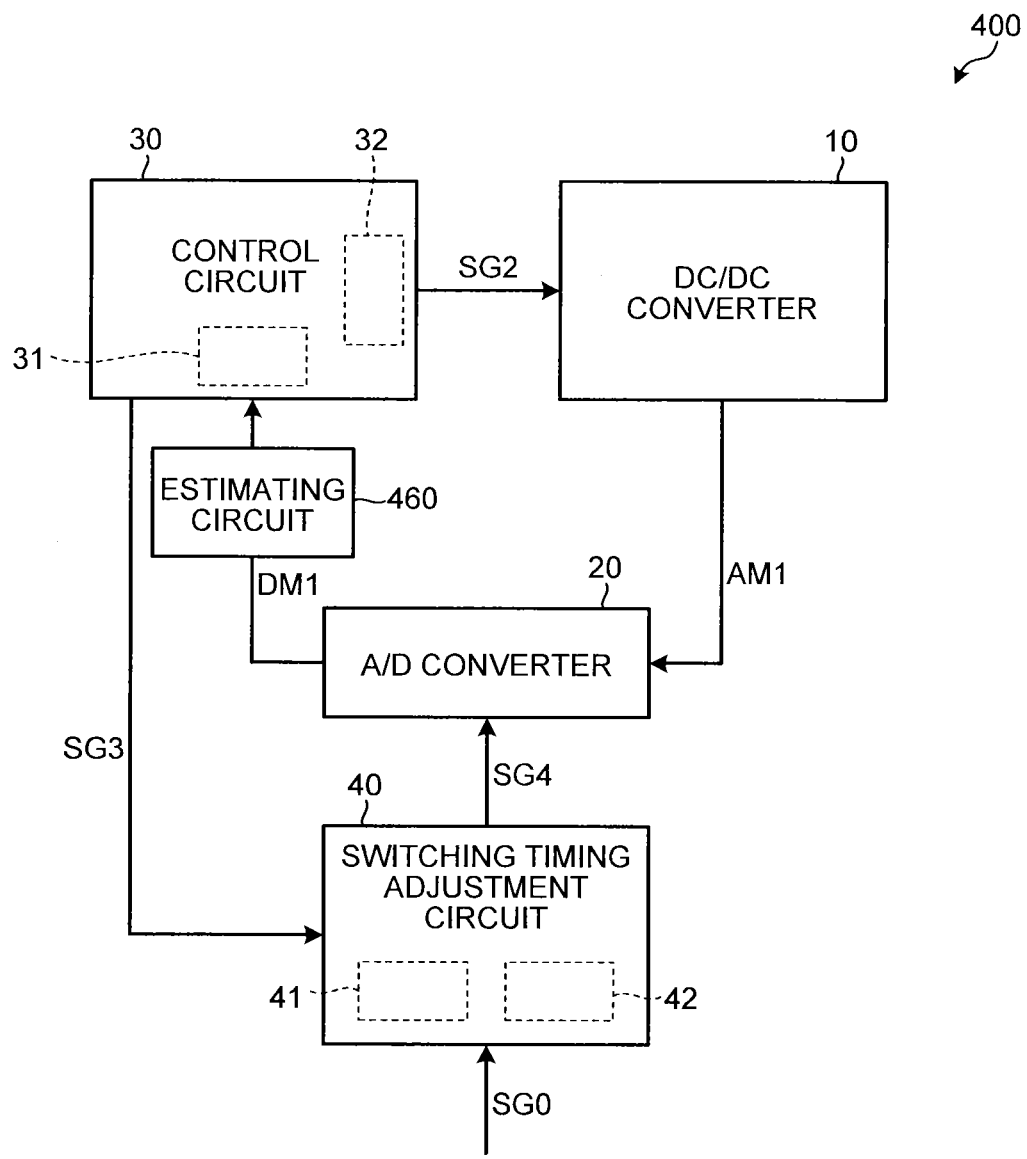
FIG. 21 is a diagram illustrating a configuration of a power circuit according to a fifth embodiment.

In the fourth embodiment, the control circuit 30 needs to change control parameters. In the fifth embodiment, in order to obtain the advantage similar to that of the fourth embodiment just by adding a circuit without changing the control parameters of the control circuit 30, an estimating circuit 460 is added as illustrated in FIG. 21.

In the power circuit 400, the estimating circuit 460 estimates a value at the original timing from an A/D conversion result obtained by shifting the timing, that is, the digital monitoring value DM1 received from the A/D converter 20.

Figure 22:
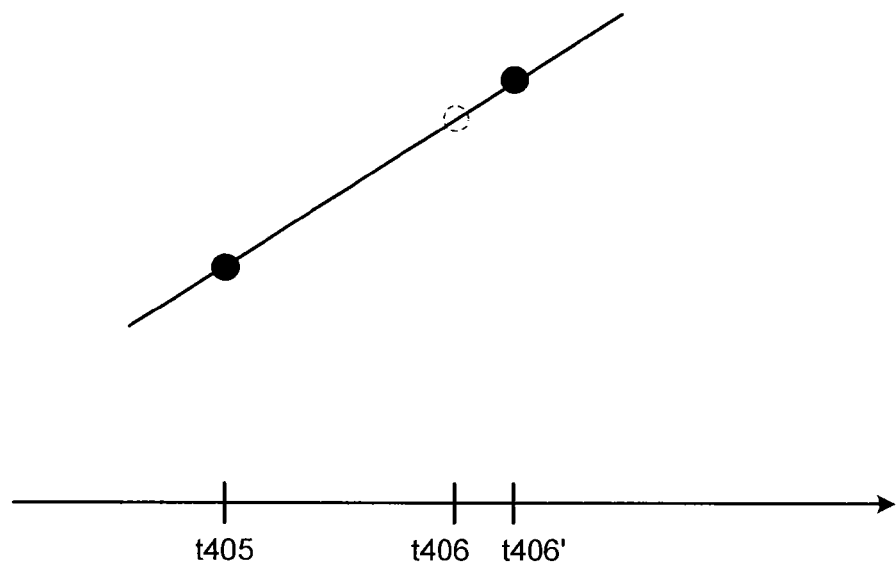
FIG. 22 is a diagram illustrating an operation of an estimating circuit according to the fifth embodiment.

The function of the estimating circuit 460 will be described with reference to FIG. 22. A case where although it was expected to perform A/D conversion at a timing t405 and perform the subsequent A/D conversion at a timing t406, since the timing t406 was determined to overlap the switching operation of the DC/DC converter 10, the A/D conversion is performed at a timing t406' that is later than the timing t406 will be considered. In this case, the value at the timing t406 may be calculated from a straight line that passes through a coordinate (value at t405, t405), and a coordinate (value at t406', t406'). That is, the estimating circuit 460 calculates the value at the timing t406 and inputs the value to the control circuit 30. In this way, it is possible to suppress the influence on the control, of the shifting of the operation clock (the conversion timing signal) of the A/D converter without changing the control parameters of the control circuit 30.

The estimating circuit 460 may estimate the value at the timing t406 from a quadratic curve, for example, that passes through three points also using the value at the A/D conversion timing that is before the timing t405. Moreover, as another estimation method, the estimating circuit 460 may use a method of approximating from a plurality of points using a high-order approximation curve, a method of estimating the current value from any one or both of the previous and subsequent values using a low-pass filter, and the like.

Sixth Embodiment

Next, a power circuit 500 according to a sixth embodiment will be described. In the following description, portions different from those of the second embodiment will be described primarily. Moreover, in the present embodiment, for the sake of convenience, description is made with reference to FIG. 10 and the like of the second embodiment by using reference numerals SG101-1 to SG101-5 for the conversion timing signals.

In the second embodiment, the A/D converter 120 performs one cycle of A/D conversion sequentially in synchronization with a plurality of (for example, five) conversion timing signals SG104-1 to SG104-5, that is using a plurality of (for example, five) clocks. In contrast, in the sixth embodiment, as illustrated in FIG. 23, an A/D converter 520 performs a plurality of cycles of A/D conversion sequentially in synchronization with a plurality of conversion timing signals SG101-1 to SG101-5 (see FIG. 10).

Specifically, in the power circuit 500, the A/D converter 520 is operated in a plurality of number of times within one cycle of the DC/DC converter 10. That is, the A/D converter 520 performs a plurality of cycles of A/D conversion sequentially in synchronization with the plurality of conversion timing signals SG101-1 to SG101-5 within one period of the first switching signal φSW1 (see FIG. 10).

Figure 23:
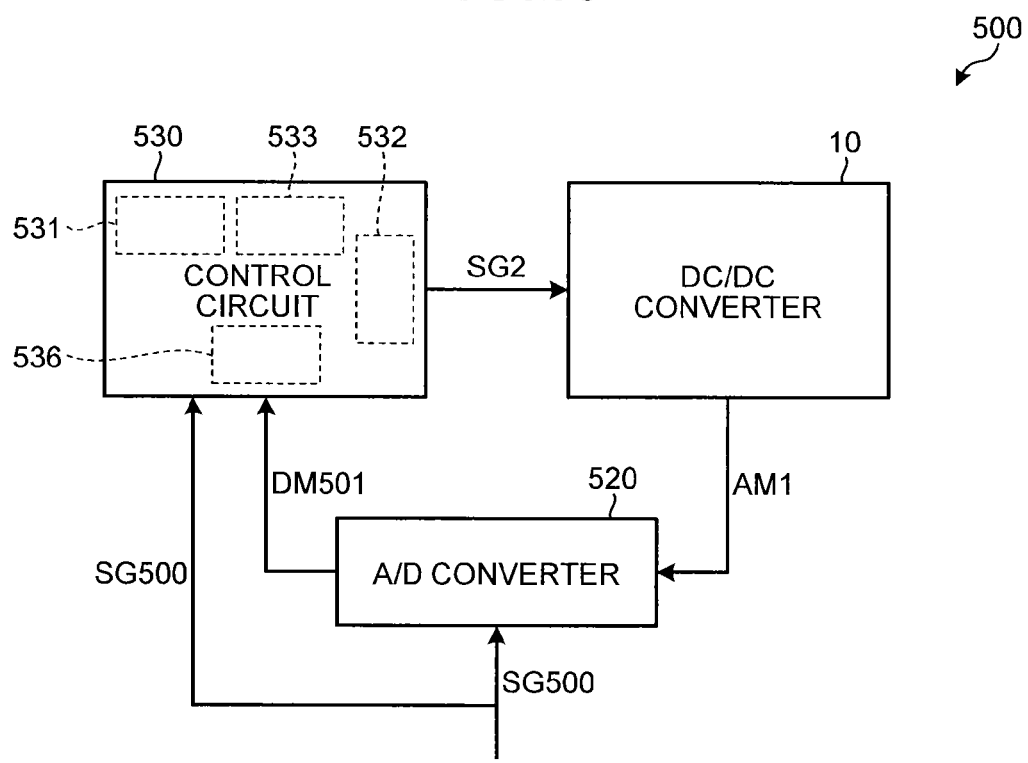
FIG. 23 is a diagram illustrating a configuration of a power circuit according to a sixth embodiment.

In the configuration illustrated in FIG. 23, since the power circuit 500 does not include the switch timing adjustment circuit 140 (see FIG. 8), there is a possibility that the switches SW1 and SW2 of the DC/DC converter 10 are turned on/off during the A/D conversion operation (see FIG. 10), and the A/D converter 520 is affected by noise. Therefore, the influence of noise is eliminated by a control circuit 530.

Specifically, the control circuit 530 includes a deciding unit 531, a digital PWM control unit 532, and a determining unit

536. The determining unit 536 receives a control signal SG2 that is supplied to the DC/DC converter 10 immediately before, for example, as a signal associated with PWM control from the digital PWM control unit 532. The determining unit 536 estimates the transition timing of the first switching signal φSW1 and the transition timing of the second switching signal φSW2 based on the control signal SG2. Moreover, the determining unit 536 receives a control signal SG500 associated with the plurality of conversion timing signals SG101-1 to SG101-5 from the outside (for example, an upper controller that is not illustrated). The determining unit 536 estimates the transition timings (for example, the rising timings) of the plurality of conversion timing signals SG101-1 to SG101-5 based on the control signal SG500. Moreover, the determining unit 536 determines whether the transition timing of each of the plurality of conversion timing signals SG101-1 to SG101-5 overlaps the transition timing of the first switching signal or the transition timing of the second switching signal and supplies the determination result to the deciding unit 531.

The deciding unit 531 acquires a digital monitoring value DM501 and specifies a value corresponding to a conversion timing signal that overlaps the transition timing of the first switching signal or the transition timing of the second switching signal among a plurality of values of the digital monitoring value DM501. Moreover, the deciding unit 531 performs an operation of deciding a control content while disregarding the specified value.

As above, since the control circuit 530 performs a control operation using the digital monitoring value DM501 while disregarding the value of the digital monitoring value DM501 corresponding to the overlapping conversion timing signal, it is possible to suppress the influence of noise on the control operation of the control circuit 530.

In the configuration of the sixth embodiment, when the A/D conversion is performed at the on/off timing of the switches SW1 and SW2 and the off state period of the plurality of switches SW1 and SW2, the control circuit 530 may use a value obtained in one cycle of A/D conversion before while disregarding the value obtained in the A/D conversion performed at that timing or the off state period. Since the output voltage or the output current of the DC/DC converter 10 does not change greatly within the one cycle of A/D conversion, the value obtained in one cycle of A/D conversion before is a good estimation for the current value. That is, the control circuit 530 may include a compensating unit 533, and the compensating unit 533 may compensate for a value that is to be obtained originally by the current A/D conversion by estimating the value using a value obtained in one cycle of A/D conversion before.

Alternatively, when A/D conversion is performed in the on/off timing of the switches SW1 and SW2 and the off state period of the plurality of switches SW1 and SW2, the control circuit 530 may use a value obtained in one cycle of A/D conversion after while disregarding the value obtained in the A/D conversion performed at that timing or the off state period. In this case, since the output voltage of the DC/DC converter 10 does not change greatly within the one cycle of A/D conversion, the value obtained in one cycle of A/D conversion before is a good estimation for the current value. That is, the control circuit 530 may include a compensating unit 533, and the compensating unit 533 may compensate for a value that is to be obtained originally by the current A/D conversion by estimating the value using a value obtained in one cycle of A/D conversion after.

As a method of further increasing accuracy, a method in which the compensating unit 533 estimates a value from a plurality of items of A/D conversion data may be considered.

For example, the compensating unit 533 may use a method of performing backward compensation linearly from the value of two cycles before and the value of one cycle before. The accuracy can be increased further using a plurality of items of data. Moreover, the data used may be the subsequent value as well as the previous value.

For example, as illustrated in FIG. 12, when the rising timing of the conversion timing signal SG101-3 overlaps the off timing of the switch SW2, the compensating unit 533 may discard the value of the digital monitoring value DM501 corresponding to the conversion timing signal SG101-3 and compensate for the value corresponding to the conversion timing signal SG101-3 based on the values before and after the discarded value.

As a good estimation method for a case where a plurality of items of data is used, the compensating unit 533 may use a method of using a low-pass filter. As described above, the output of the DC/DC converter 10 does not change abruptly within one cycle of A/D conversion. Therefore, the compensating unit 533 can estimate the current value from any one or both of the previous and subsequent values using a low-pass filter.

Seventh Embodiment

Next, a power circuit 600 according to a seventh embodiment will be described. In the following description, portions different from those of the second embodiment will be described primarily. Moreover, in the present embodiment, for the sake of convenience, description is made with reference to FIGS. 10 to 16 of the second embodiment.

In the second embodiment, the A/D converter 120 performs one cycle of A/D conversion sequentially in synchronization with the plurality of conversion timing signals SG104-1 to SG104-5. In contrast, in the seventh embodiment, an A/D converter 520 performs a plurality of cycles of A/D conversion sequentially in synchronization with a plurality of conversion timing signals SG104-1 to SG104-5 (see FIG. 10).

Specifically, in the power circuit 600, the A/D converter 520 is operated a plurality of number of times within one switching period of the DC/DC converter 10. That is, the A/D converter 520 performs a plurality of cycles of A/D conversion sequentially in synchronization with the plurality of conversion timing signals SG104-1 to SG104-5 within one period of the first switching signal φSW1 (see FIG. 10).

Figure 24:
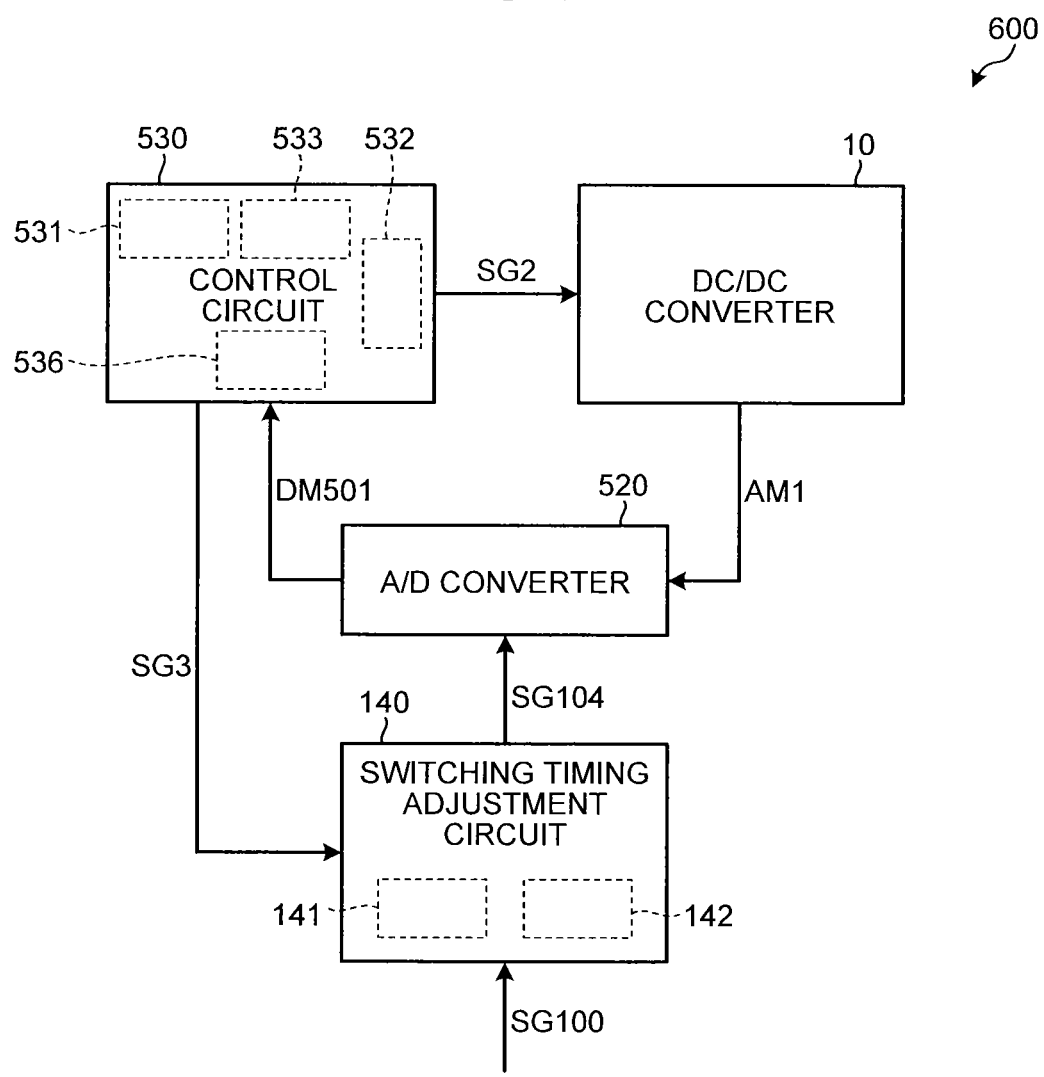
FIG. 24 is a diagram illustrating a configuration of a power circuit according to a seventh embodiment.

In the configuration illustrated in FIG. 24, in the power circuit 600, when the transition timing of any one of the plurality of conversion candidate timing signals SG101-1 to SG101-5 overlaps the transition timing of the first switching signal φSW1 or the transition timing of the second switching signal φSW2, the switch timing adjustment circuit 140 adjusts the conversion candidate timing signals SG101-1 to SG101-5 so that the transition timings of the plurality of conversion candidate timing signals SG101-1 to SG101-5 do not overlap the transition timing of the first switching signal φSW1, the transition timing of the second switching signal φSW2, and a period where both the first switching signal φSW1 and the second switching signal φSW2 are in the non-active level to thereby generate a plurality of conversion timing signals SG104-1 to SG104-5.

In this way, when the A/D converter 520 is an oversampling-type A/D converter, since all of the rising timings of the plurality of conversion timing signals SG104-1 to SG104-5 can be made not to overlap the occurrence timing of the switching noise, it is possible to suppress the switching noise occurring with the switching of the DC/DC converter 10 from affecting the A/D conversion operation of the A/D converter 520.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power circuit comprising:
a DC/DC converter which includes a first switch that is turned on according to a first switching signal and a second switch that is turned on according to a second switching signal, and in which an on state period of the first switch does not overlap an on state period of the second switch;
an A/D converter that performs A/D conversion on an analog monitoring value of the DC/DC converter in synchronization with a conversion timing signal to generate a digital monitoring value;
a control unit that performs PWM control on each of the first switching signal and the second switching signal using the generated digital monitoring value;
a determining unit that receives a signal associated with the PWM control and a signal associated with a conversion candidate timing signal that serves as a candidate for the conversion timing signal and determines whether a transition timing of the conversion candidate timing signal overlaps a transition timing of the first switching signal or a transition timing of the second switching signal; and
a conversion timing adjusting unit that adjusts the conversion candidate timing signal so that the transition timing of the conversion candidate timing signal does not overlap the transition timing of the first switching signal and the transition timing of the second switching signal when the transition timing of the conversion candidate timing signal overlaps the transition timing of the first switching signal or the transition timing of the second switching signal to thereby generate the conversion timing signal.

2. The power circuit according to claim 1, wherein
the determining unit determines whether the transition timing of the conversion candidate timing signal overlaps a period in which both the first switching signal and the second switching signal are in a non-active level, and
the conversion timing adjusting unit adjusts the conversion candidate timing signal so that the transition timing of the conversion candidate timing signal does not overlap the period in which both the first switching signal and the second switching signal are in the non-active level to thereby generate the conversion timing signal.

3. The power circuit according to claim 1, wherein
the conversion timing adjusting unit generates the conversion timing signal by calculating a timing that does not overlap the transition timing of the first switching signal and the transition timing of the second switching signal and shifting the transition timing of the conversion candidate timing signal to the calculated timing.

4. The power circuit according to claim 3, wherein
the control unit changes a control parameter in response to shifting of the transition timing of the conversion candidate timing signal and performs the PWM control using the changed control parameter.

5. The power circuit according to claim 1, wherein
the control unit supplies a first control signal to the DC/DC converter, and
the DC/DC converter further includes
a decoding unit that decodes the first control signal and extracts a first control value for the first switch and a second control value for the second switch from a decoding result; and
a state notifying unit that generates a second control signal including the first control value and the second control value and supplies the second control signal to the determining unit as the signal associated with the PWM control.

6. The power circuit according to claim 1, wherein
the A/D converter is a successive comparison-type A/D converter that performs one cycle of A/D conversion sequentially in synchronization with a plurality of the conversion timing signals,
the determining unit receives the signal associated with the PWM control and signals associated with a plurality of the conversion candidate timing signals that serve as the candidates for the plurality of conversion timing signals and determines whether the transition timing of each of the plurality of conversion candidate timing signals overlaps the transition timing of the first switching signal or the transition timing of the second switching signal, and
the conversion timing adjusting unit generates a plurality of the conversion timing signals by shifting the plurality of conversion candidate timing signals so that the transition timing of a second conversion candidate timing signal among the plurality of conversion candidate timing signals becomes an intermediate timing between a first period in which both the first switching signal and the second switching signal are in a non-active level and a second period in which both the first switching signal and the second switching signal are in the non-active level.

7. The power circuit according to claim 1, wherein
the A/D converter is a successive comparison-type A/D converter that performs one cycle of A/D conversion sequentially in synchronization with a plurality of the conversion timing signals,
the determining unit receives the signal associated with the PWM control and signals associated with a plurality of the conversion candidate timing signals that serve as the candidates for the plurality of conversion timing signals and determines whether the transition timing of each of the plurality of conversion candidate timing signals overlaps the transition timing of the first switching signal or the transition timing of the second switching signal, and
the conversion timing adjusting unit generates the plurality of conversion timing signals by halting the plurality of conversion candidate timing signals in a period in which both the first switching signal and the second switching signal are in a non-active level and restarting the plurality of conversion candidate timing signals after an elapse of the period.

8. The power circuit according to claim 1, wherein
the A/D converter is a successive comparison-type A/D converter that performs one cycle of A/D conversion sequentially in synchronization with a plurality of the conversion timing signals, the determining unit receives the signal associated with the PWM control and signals associated with a plurality of the conversion candidate timing signals that serve as the candidates for the plurality of conversion timing signals, in which the plurality of conversion candidate timing signals includes a first conversion candidate timing signal and a second conversion candidate timing signal of which an amount of noise allowed for the A/D converter is smaller than that of the first conversion candidate timing signal, the determining unit determines whether the transition timing of at least one of the second conversion candidate timing signals overlaps the transition timing of the first switching signal or the transition timing of the second switching signal, and the conversion timing adjusting unit generates the plurality of conversion timing signals by calculating a timing that does not overlap the transition timing of the first switching signal and the transition timing of the second switching signal and shifting the transition timing of the second conversion candidate timing signal to the calculated timing.

9. The power circuit according to claim 8, wherein
the control unit changes a control parameter in response to shifting of the transition timing of the second conversion candidate timing signal and performs the PWM control using the changed control parameter.

10. A power circuit comprising:
a DC/DC converter which includes a first switch that is turned on according to a first switching signal and a second switch that is turned on according to a second switching signal, and in which an on state period of the first switch does not overlap an on state period of the second switch;
an A/D converter that performs A/D conversion on an analog monitoring value of the DC/DC converter in synchronization with a conversion timing signal to generate a digital monitoring value;
a control unit that performs PWM control on each of a first candidate switching signal that serves as a candidate for the first switching signal and a second candidate switching signal that serves as a candidate for the second switching signal using the generated digital monitoring value;
a determining unit that receives a signal associated with the PWM control and a signal associated with the conversion timing signal and determines whether a transition timing of the conversion timing signal overlaps a transition timing of the first candidate switching signal or a transition timing of the second candidate switching signal; and
a switch timing adjusting unit that adjusts the first candidate switching signal and the second candidate switching signal so that the transition timings thereof do not overlap the transition timing of the conversion timing signal when the transition timing of the conversion timing signal overlaps the transition timing of the first candidate switching signal or the transition timing of the second candidate switching signal, generates a control signal in which the adjustment result is reflected in the PWM control, and supplies the generated control signal to the DC/DC converter.

11. The power circuit according to claim 10, wherein
the switch timing adjusting unit adjusts the first candidate switching signal and the second candidate switching signal, by calculating a timing that does not overlap the transition timing of the conversion timing signal with respect to each of the first candidate switching signal and the second candidate switching signal, and by shifting each of the transition timing of the first candidate switching signal and the transition timing of the second candidate switching signal to the calculated timing.

12. The power circuit according to claim 11, wherein
the control unit changes a control parameter in response to shifting of the transition timing of the second conversion candidate timing signal and generates the control signal using the changed control parameter.

13. The power circuit according to claim 10, wherein
the switch timing adjusting unit stops the supply of the control signal to the DC/DC converter at the transition timing of the conversion timing signal.

14. A power circuit comprising:
a DC/DC converter which includes a first switch that is turned on according to a first switching signal and a second switch that is turned on according to a second switching signal, and in which an on state period of the first switch does not overlap an on state period of the second switch;
an A/D converter that performs A/D conversion on an analog monitoring value of the DC/DC converter in synchronization with a conversion timing signal to generate a digital monitoring value;
a control unit that performs PWM control on each of the first switching signal and the second switching signal using the generated digital monitoring value; a determining unit that receives a signal associated with the PWM control and signals associated with a plurality of the conversion candidate timing signals that serve as candidates for the plurality of conversion timing signals and determines whether a transition timing of each of the plurality of conversion candidate timing signals overlaps a transition timing of the first switching signal or a transition timing of the second switching signal; and a conversion timing adjusting unit that adjusts the plurality of conversion candidate timing signals so that the transition timing of any one of the plurality of conversion candidate timing signals does not overlap the transition timing of the first switching signal and the transition timing of the second switching signal when the transition timing of any one of the plurality of conversion candidate timing signals overlaps the transition timing of the first switching signal or the transition timing of the second switching signal to thereby generate a plurality of the conversion timing signals, wherein the A/D converter performs A/D conversion several times sequentially in synchronization with a plurality of the conversion timing signals within one period of the first switching signal.

15. The power circuit according to claim 14, wherein
the conversion timing adjusting unit generates the plurality of conversion timing signals, by calculating a timing that does not overlap the transition timing of the first switching signal and the transition timing of the second switching signal, and by shifting the transition timing of the conversion candidate timing signal that overlaps the transition timing of the first switching signal or the transition timing of the second switching signal to the calculated timing.

16. The power circuit according to claim 15, wherein
the control unit changes a control parameter in response to shifting of the transition timing of the overlapping conversion candidate timing signal and performs the PWM control using the changed control parameter.

17. The power circuit according to claim 14, wherein the conversion timing adjusting unit generates the plurality of conversion timing signals by removing the conversion candidate timing signal of which the transition timing overlaps the transition timing of the first switching signal or the transition timing of the second switching signal from the plurality of conversion candidate timing signals.

18. The power circuit according to claim 17, wherein the control unit interpolates a value of a bit of the generated digital monitoring value corresponding to the removed conversion candidate timing signal based on the values of bits around the bit.

19. A power circuit comprising: a DC/DC converter which includes a first switch that is turned on according to a first switching signal and a second switch that is turned on according to a second switching signal, and in which an on state period of the first switch does not overlap an on state period of the second switch; an A/D converter that performs A/D conversion on an analog monitoring value of the DC/DC converter in synchronization with a conversion timing signal to generate a digital monitoring value; a control unit that performs PWM control on each of the first switching signal and the second switching signal using the generated digital monitoring value; and a determining unit that receives a signal associated with the PWM control and signals associated with a plurality of the conversion timing signals and determines whether a transition timing of each of the plurality of conversion timing signals overlaps a transition timing of the first switching signal or a transition timing of the second switching signal, wherein the control unit uses the generated digital monitoring value while disregarding a value of a bit of the generated digital monitoring value corresponding to the overlapping conversion candidate timing signal.

* * * * *